Jan. 11, 1927.
R. L. GOETZENBERGER
1,613,822
ANTIAIRCRAFT FIRE CONTROL SYSTEM
Filed April 15, 1924    20 Sheets-Sheet 3

INVENTOR
*Ralph L. Goetzenberger*
BY
*W. H. Roach*
ATTORNEY

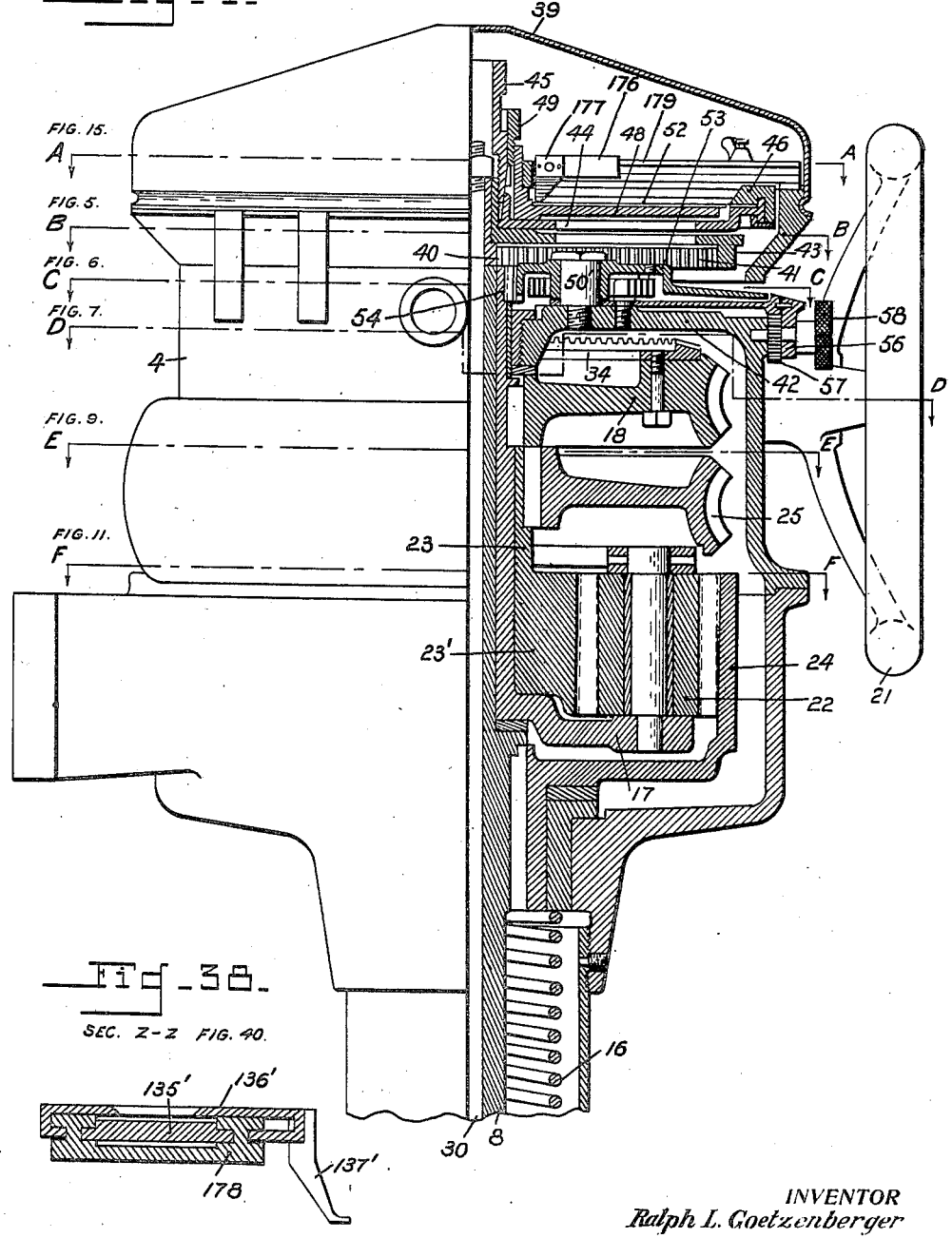

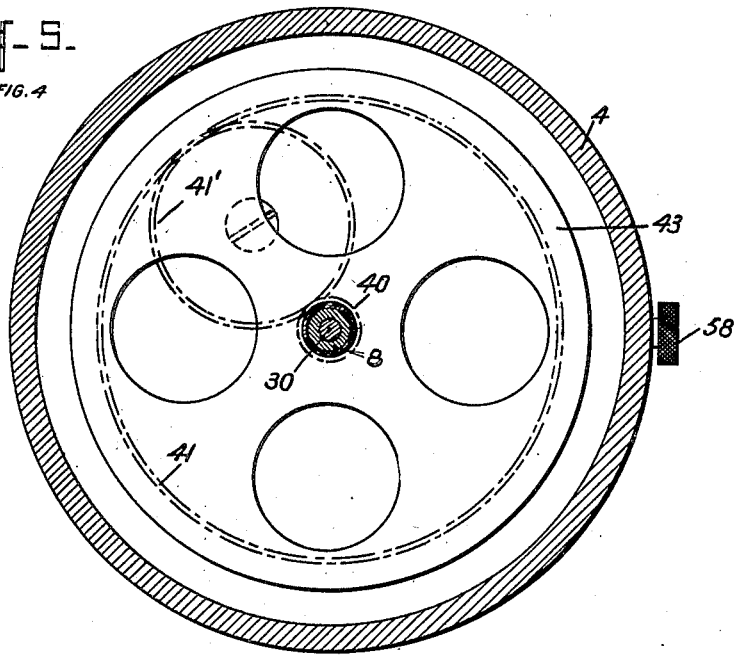
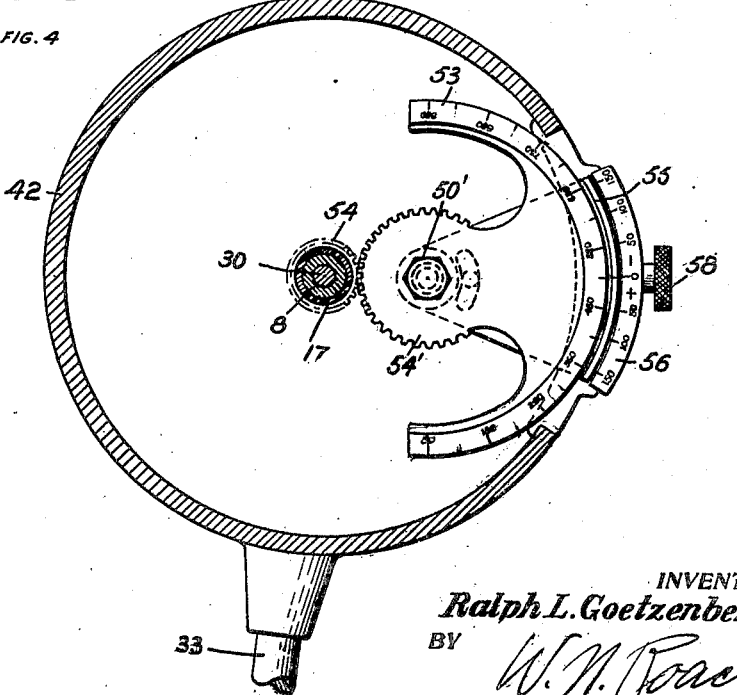

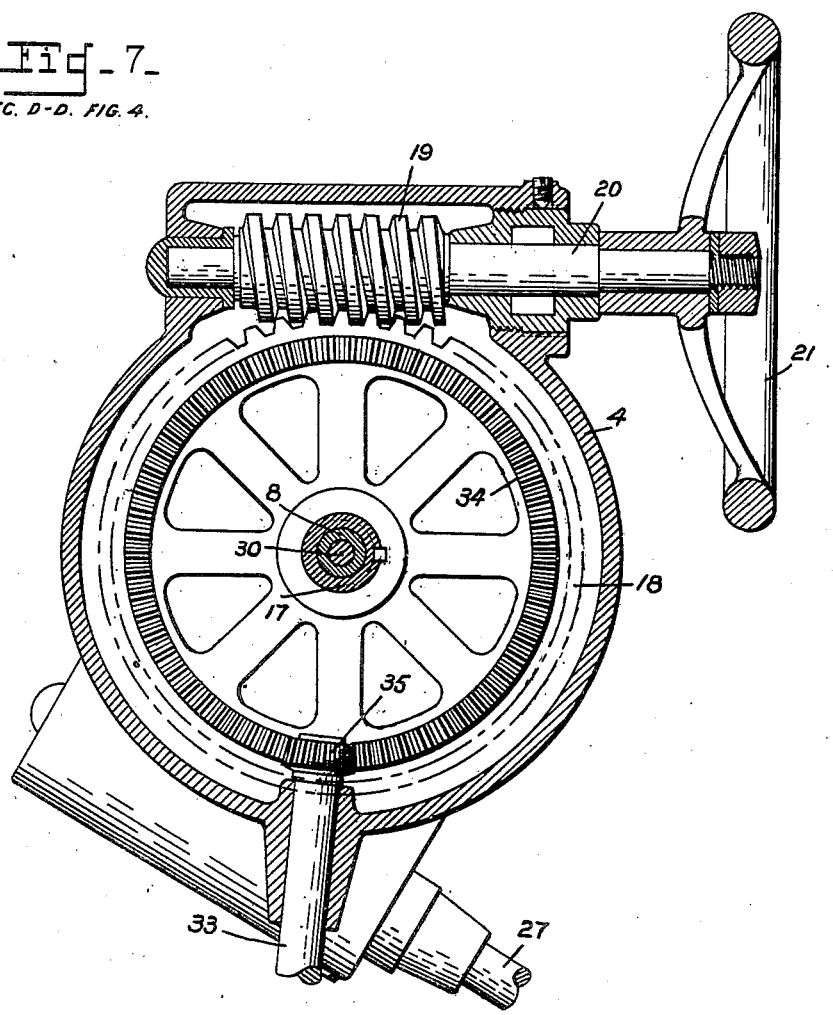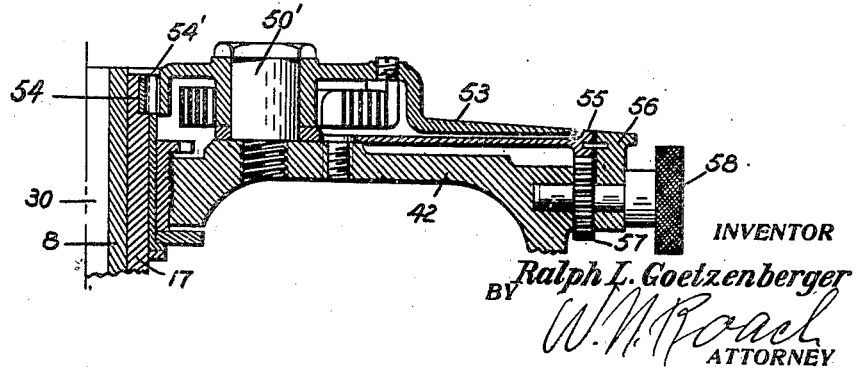

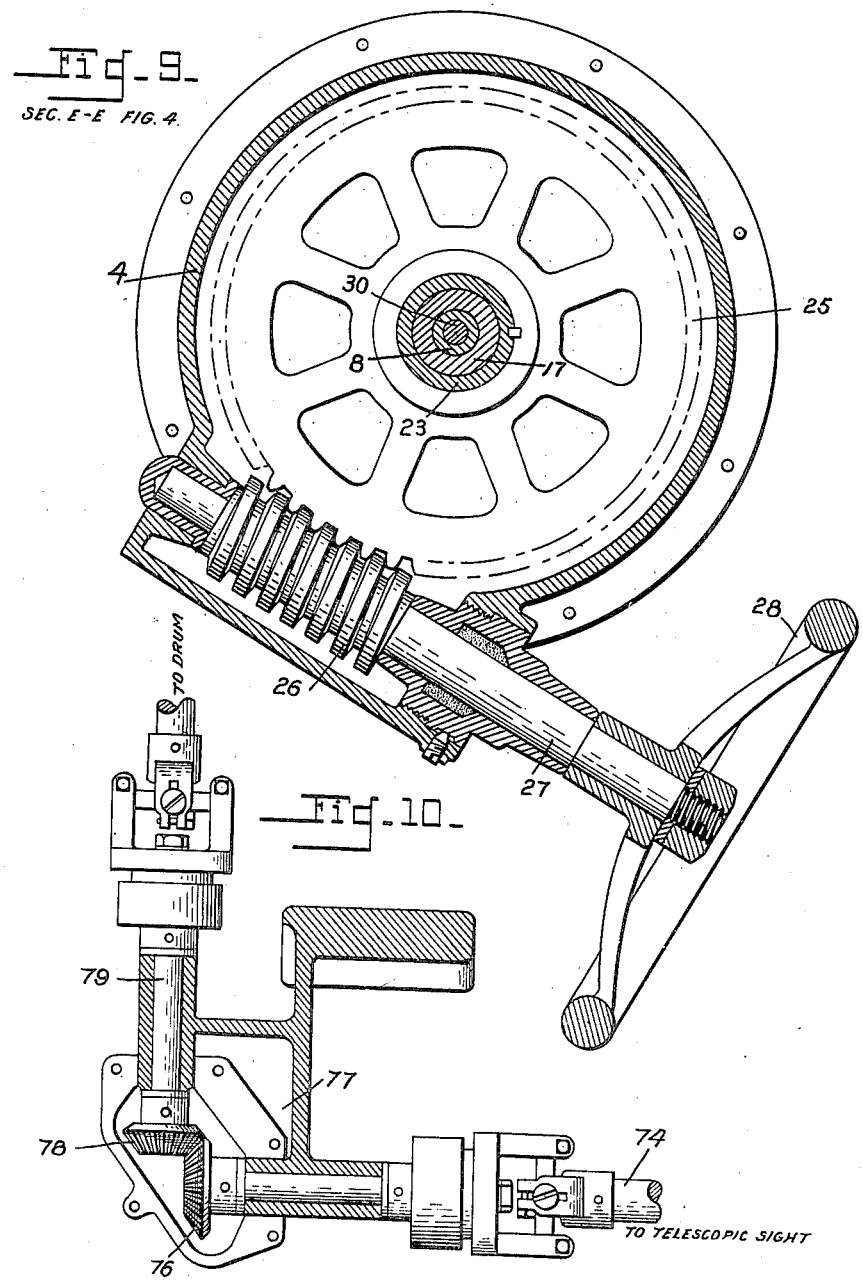

Jan. 11, 1927.   R. L. GOETZENBERGER   1,613,822
ANTIAIRCRAFT FIRE CONTROL SYSTEM
Filed April 15, 1924   20 Sheets-Sheet 8

SEC. F-F. FIG. 4.

INVENTOR
Ralph L. Goetzenberger
BY W. N. Roach
ATTORNEY

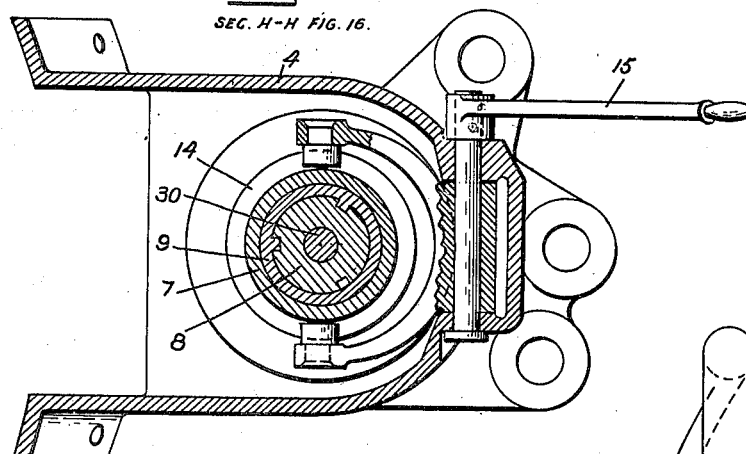
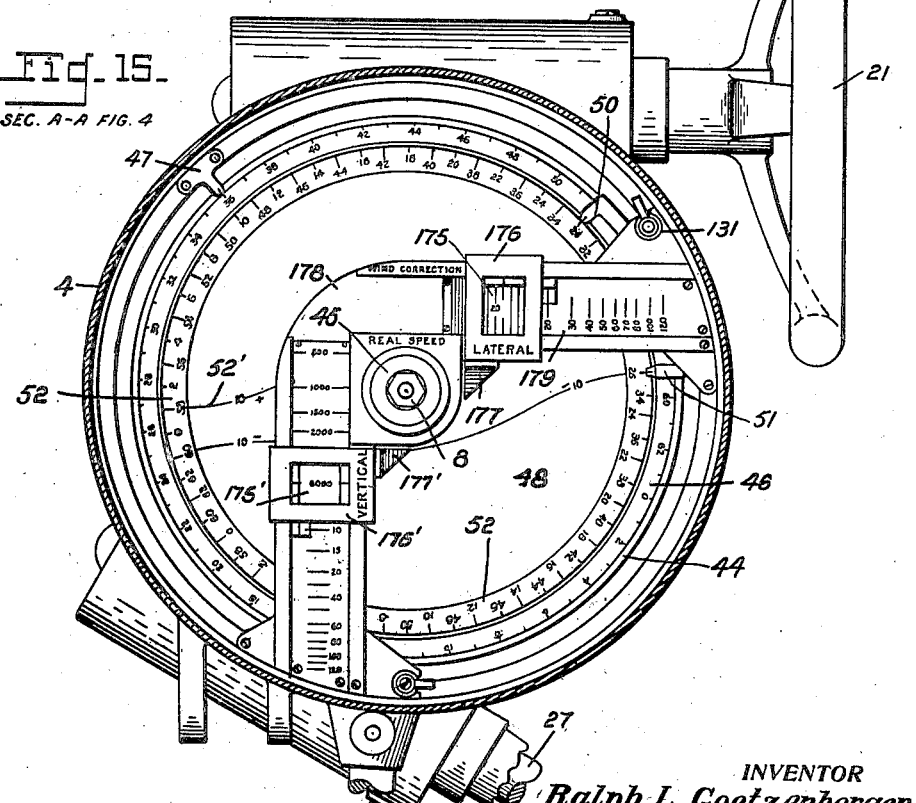

Jan. 11, 1927.  
R. L. GOETZENBERGER  
ANTIAIRCRAFT FIRE CONTROL SYSTEM  
Filed April 15, 1924   20 Sheets-Sheet 10

1,613,822

INVENTOR  
BY *Ralph L. Goetzenberger*  
ATTORNEY

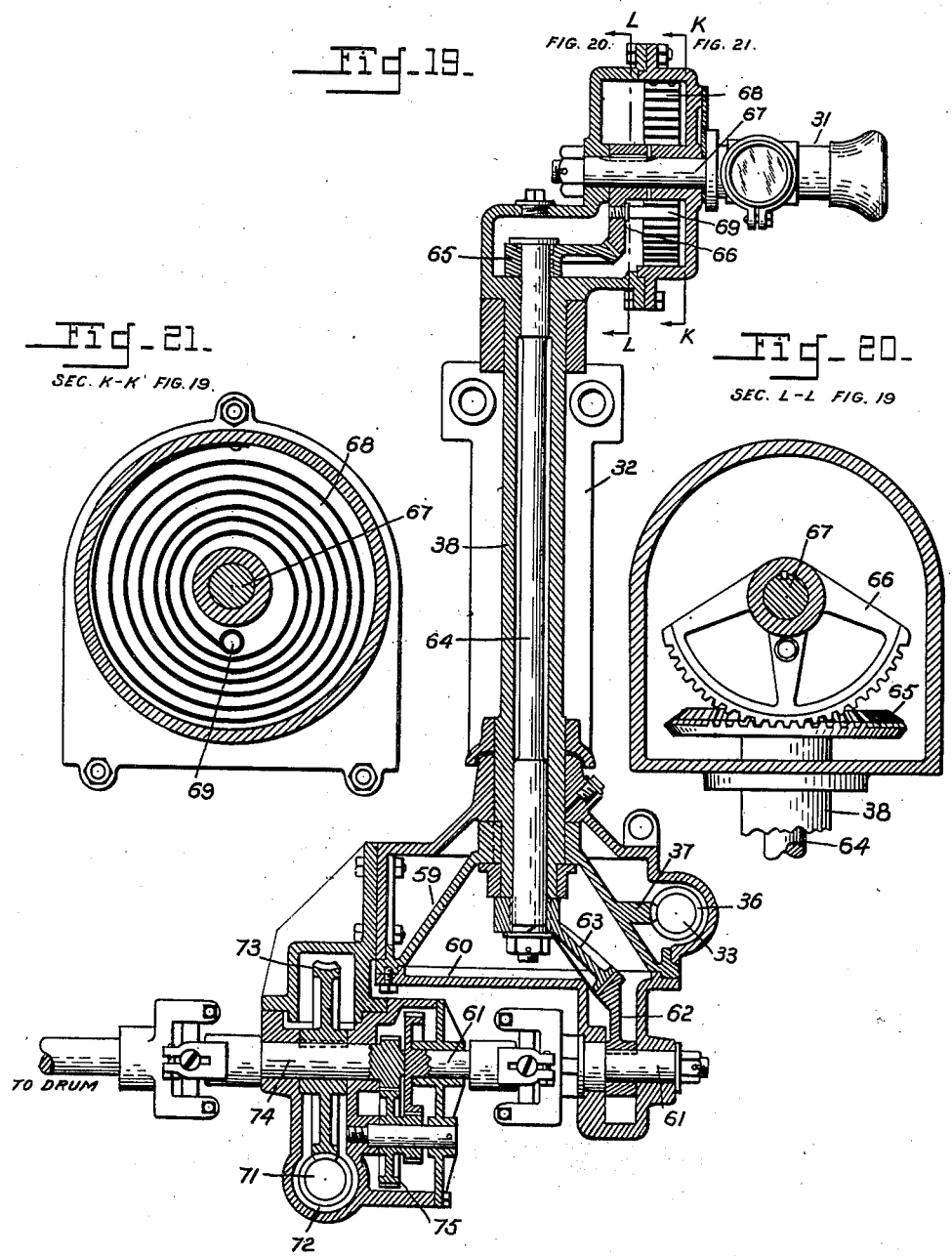

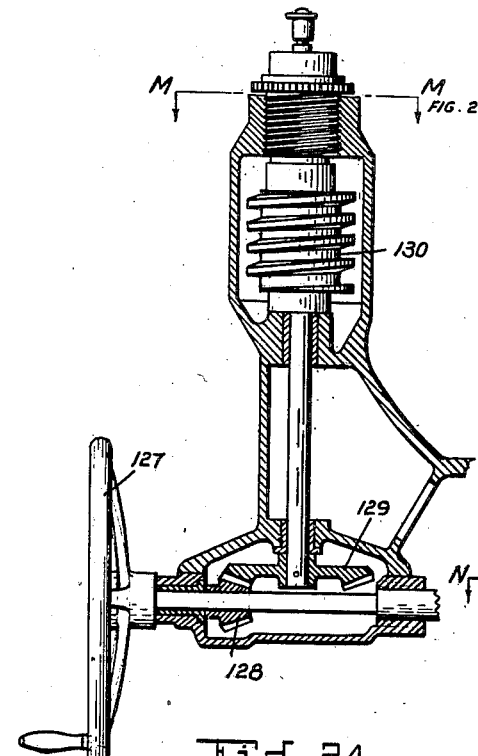
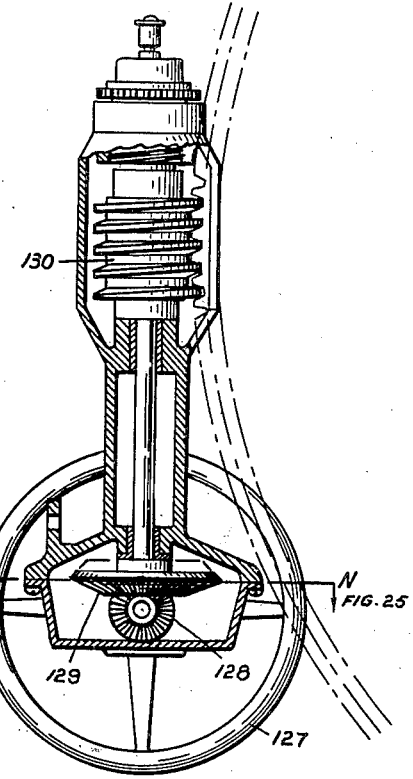
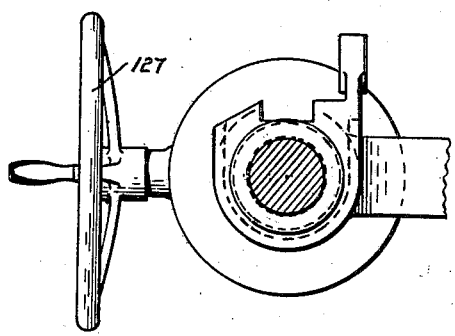
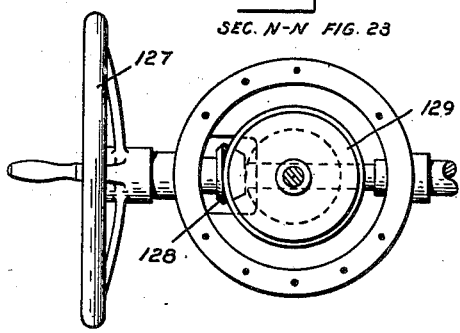

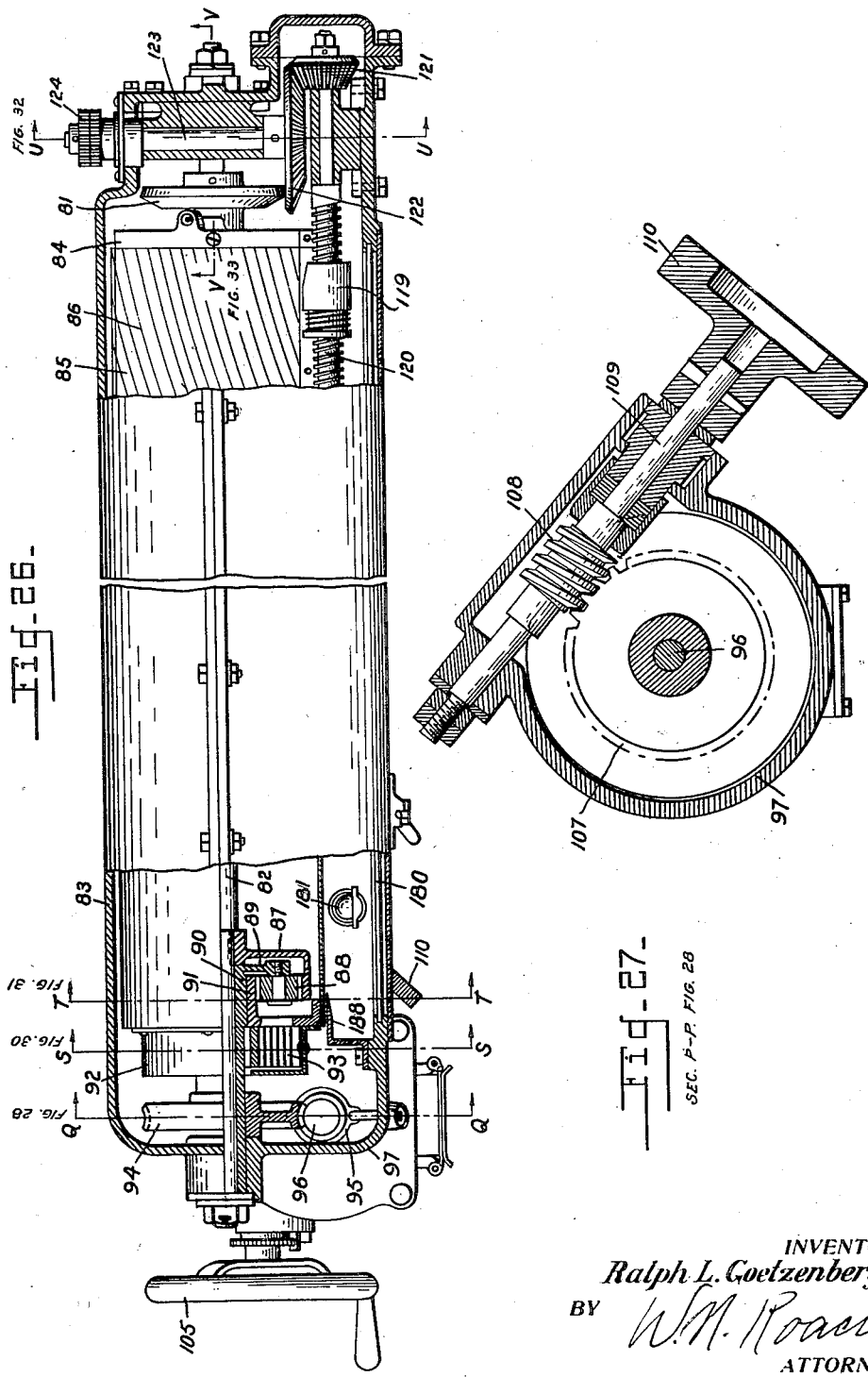

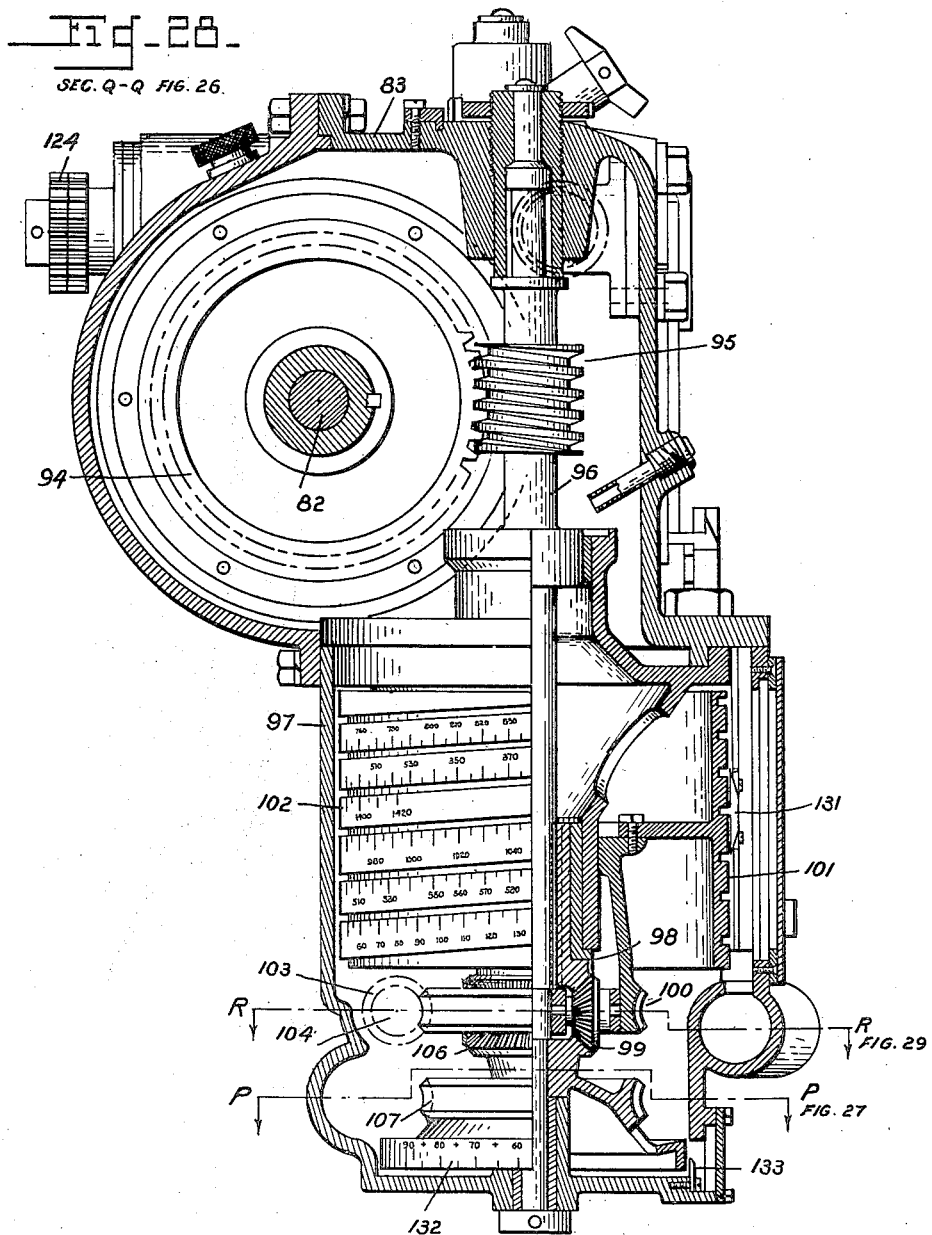

Jan. 11, 1927.　　　　　1,613,822
R. L. GOETZENBERGER
ANTIAIRCRAFT FIRE CONTROL SYSTEM
Filed April 15, 1924　　20 Sheets-Sheet 15
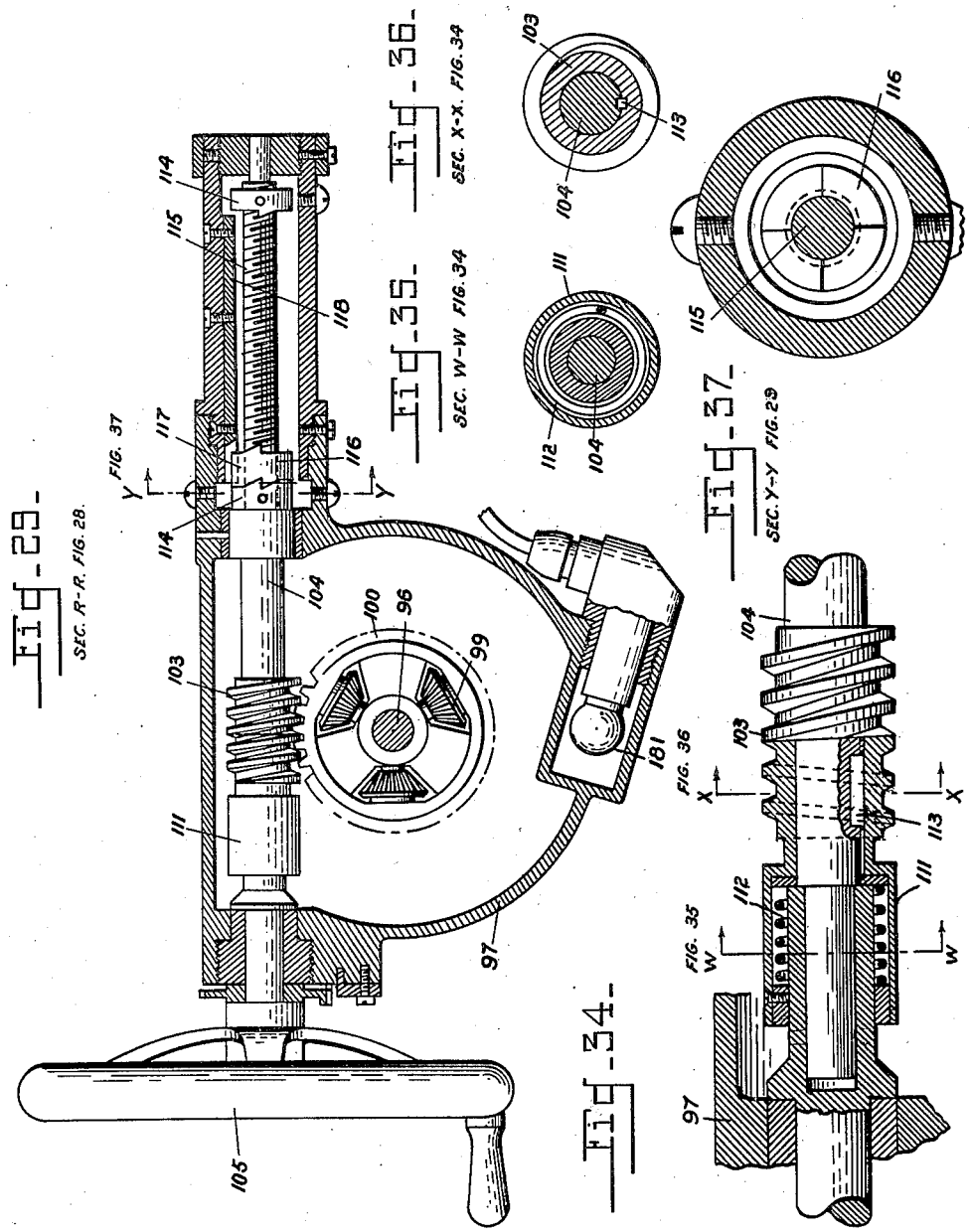
INVENTOR
Ralph L. Goetzenberger
BY
ATTORNEY

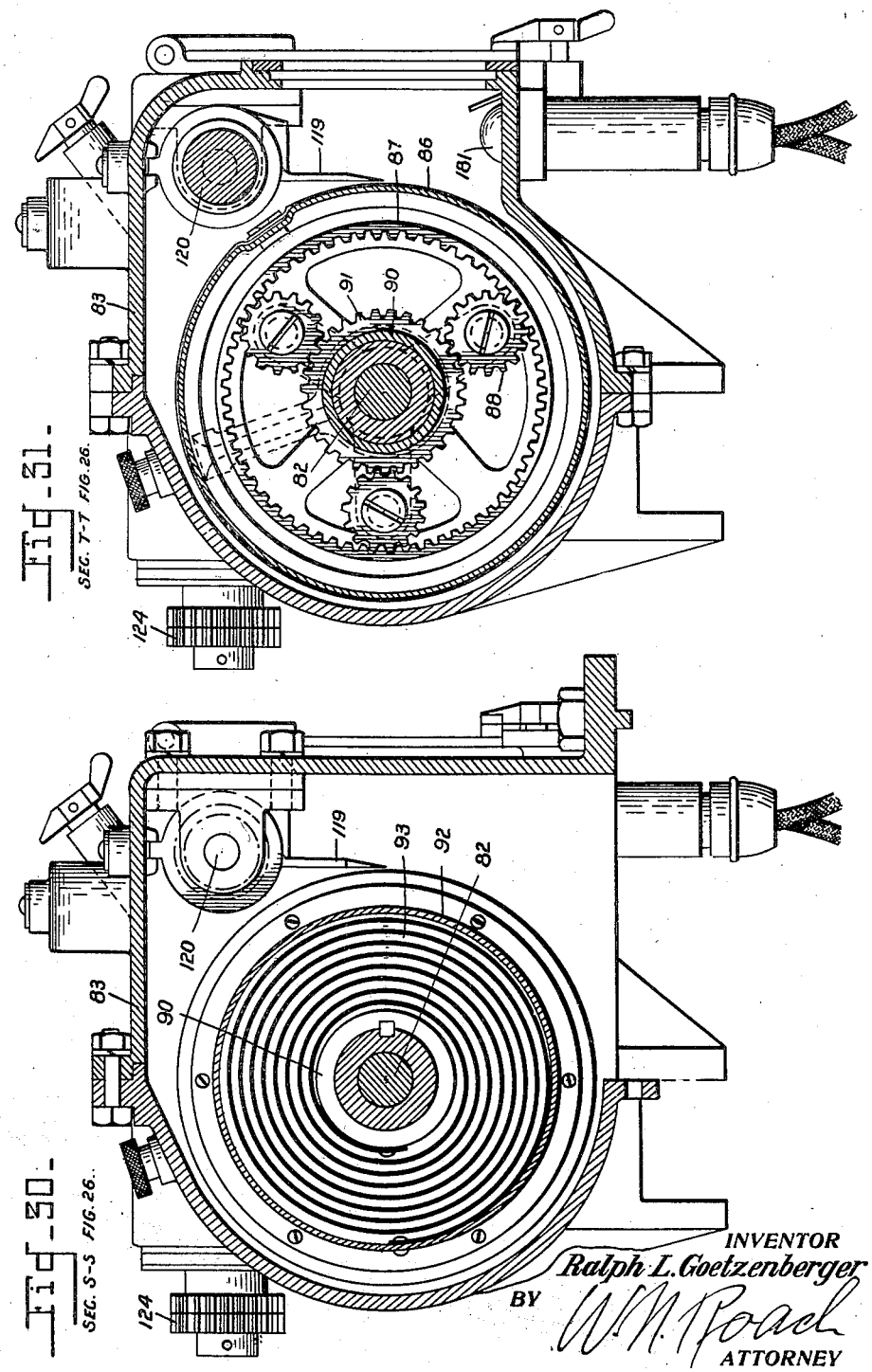

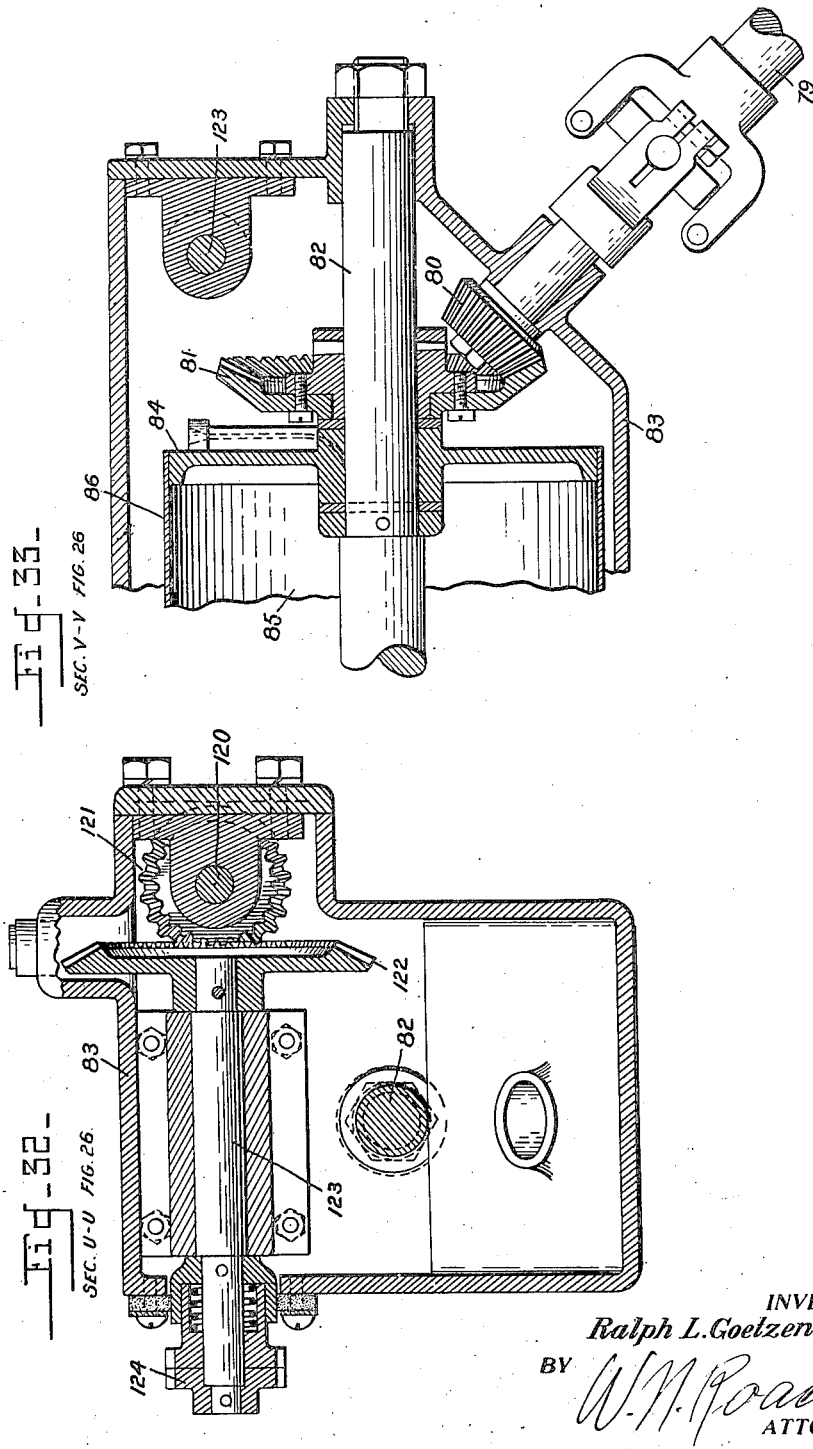

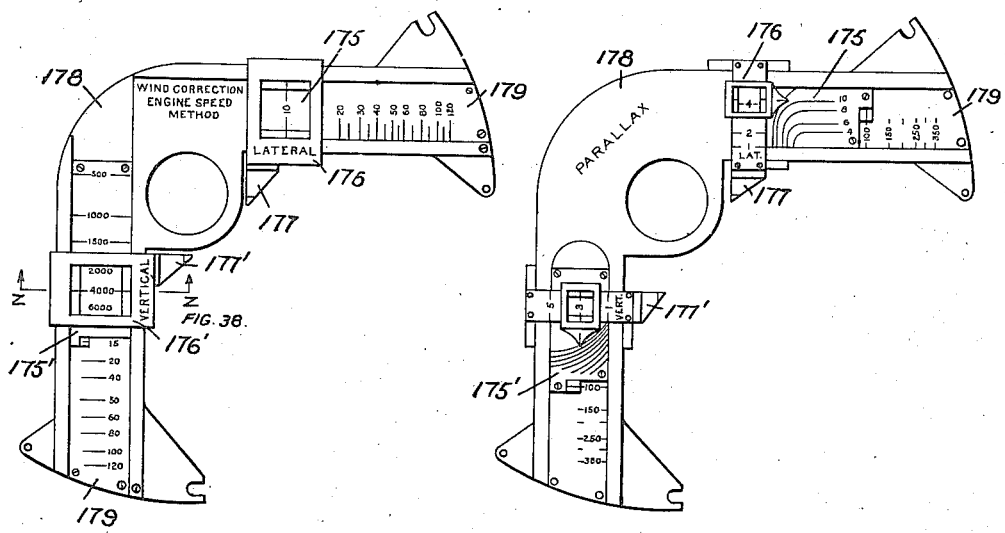

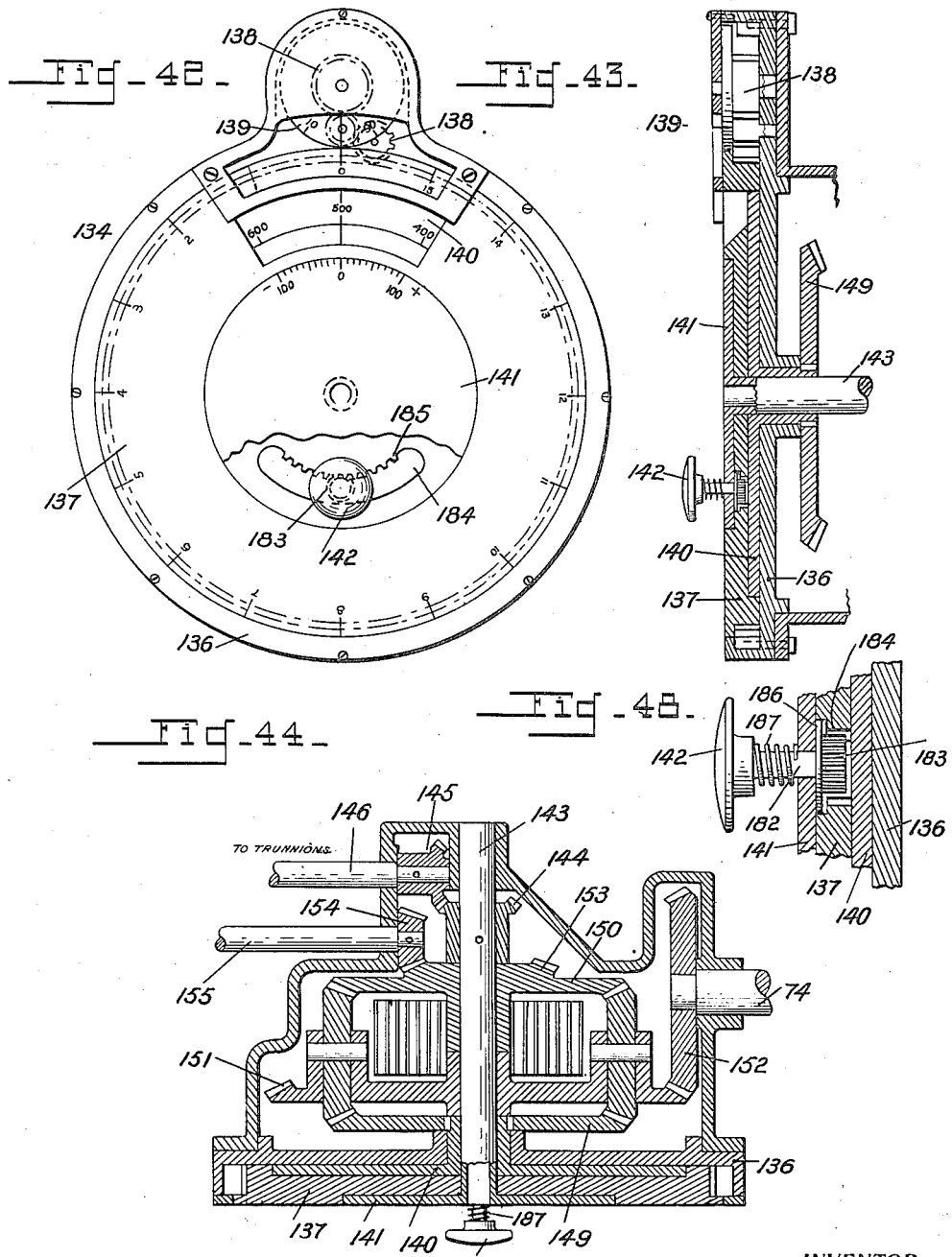

Jan. 11, 1927.
R. L. GOETZENBERGER
1,613,822
ANTIAIRCRAFT FIRE CONTROL SYSTEM
Filed April 15, 1924    20 Sheets-Sheet 20
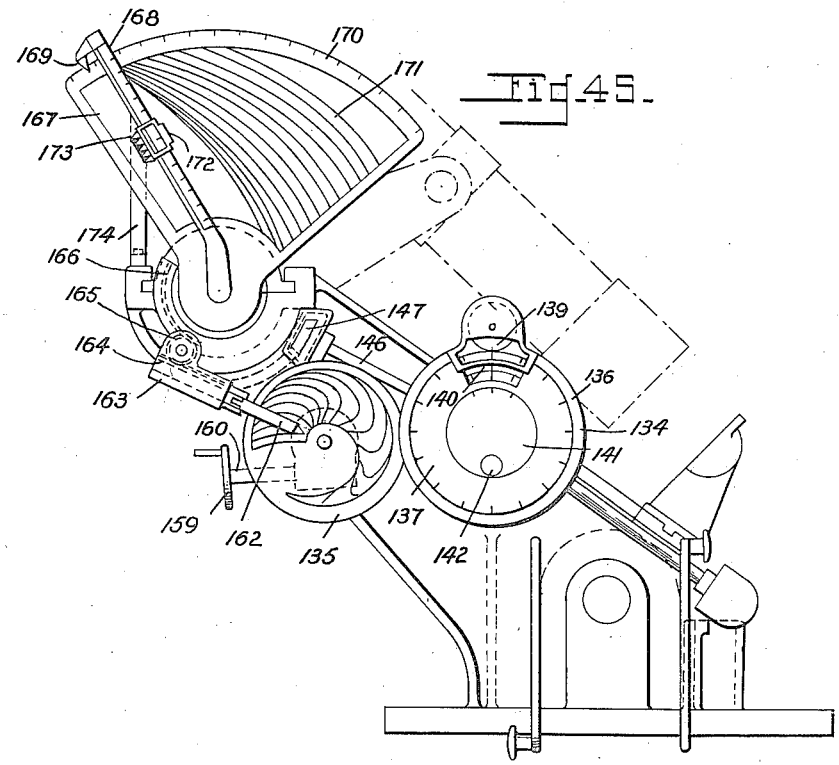
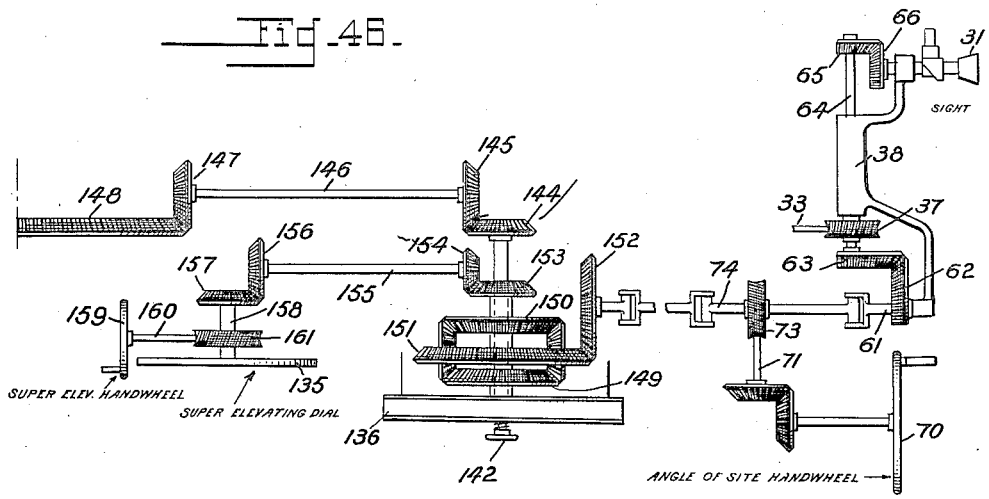
INVENTOR
Ralph L. Goetzenberger
BY
ATTORNEY Patented Jan. 11, 1927.

1,613,822

UNITED STATES PATENT OFFICE.

RALPH L. GOETZENBERGER, OF PHILADELPHIA, PENNSYLVANIA.

ANTIAIRCRAFT FIRE-CONTROL SYSTEM.

Application filed April 15, 1924. Serial No. 706,745.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is an antiaircraft fire control system designed to direct gun fire upon a moving target.

When aiming a gun upon a moving target, whether it be traveling through air—an airplane for example—or upon water or upon land, it is imperative that the gun sighting telescope at all times follow the target throughout its movements, and that the gun, in order that its fired projectile may burst at the predicted future position of the target, be laid both in azimuth and elevation to such future position. To accomplish this requires that the gun be set forward from parallelisms of its axis of bore with the optical axis of the telscope angular amounts in azimuth equal to the lateral deflection corrections and in elevation equal to the algebraic sum of the vertical deflection corrections and the angle of super-elevation, i. e., the angle between the line of sight and axis of the gun when the gun is fired.

To attain the foregoing results, I provide gearing for traversing the gun and telescope in such a relation that the telescope continuously follows the target while the gun moves through such an angle that a shell fired from the gun will arrive at the predicted future position of the target when the target arrives at such future position, and also gearing for elevating the gun and telescope in such a manner that, while the telescope continuously follows the target, there are added algebraically to the vertical movement of the gun in unison with the telscope the vertical deflection corrections and the angle of super-elevation. For this purpose, mechanisms are provided which will permit of such addition without disturbing continuous observation of the target through the telescope regardless of the laying of the gun.

A practical embodiment of the invention is shown by way of illustration in the accompanying drawings, wherein:

Fig. 4 is a view partly in section of the traversing mechanism assembly;

Fig. 5 is a section on the line B—B of Fig. 4;

Fig. 6 is a section on the line C—C of Fig. 4;

Fig. 7 is a section on the line D—D of Fig. 4;

Fig. 8 is a detailed sectional view of the lateral deflection pointer assembly;

Fig. 9 is a section taken on the line E—E of Fig. 4;

Fig. 10 is a detailed sectional view with parts in elevation of shafts leading from the telescope to the range cylinder and the gearing between the same;

Fig. 14 is a section taken on the line H—H of Fig. 16.

Fig. 15 is a section taken on the line A—A of Fig. 4;

Fig. 19 is a longitudinal section of the sight bracket assembly;

Fig. 20 is an enlarged sectional view taken on the line L—L of Fig. 19;

Fig. 21 is a similar view taken on the line K—K of Fig. 19;

Figs. 22 and 23 are longitudinal sectional views of the elevating worm taken at right angles to each other;

Fig. 24 is a section taken on the line M—M of Fig. 22;

Fig. 25 is a section taken on the line N—N of Fig. 23;

Fig. 26 is a plan view, partly in section of the cylinder assembly;

Fig. 27 is a sectional view taken on the line P—P of Fig. 28;

Fig. 28 is a sectional view taken on the line Q—Q of Fig. 26;

Fig. 29 is a sectional view taken on the line R—R of Fig. 28;

Fig. 30 is a sectional view taken on the line S—S of Fig. 26;

Fig. 31 is a sectional view taken on the line T—T of Fig. 26;

Fig. 32 is a sectional view taken on the line U—U of Fig. 26;

Fig. 33 is a sectional view on the line V—V of Fig. 26;

Fig. 34 is a fragmentary view in longitudinal section showing an arrangement for preventing back lash;

Fig. 35 is a sectional view taken on the line W—W of Fig. 34;

Fig. 36 is a section taken on the line X—X of Fig. 34;

Fig. 37 is a section taken on the line Y—Y of Fig. 29;

Fig. 38 is a sectional view taken on the line Z—Z of Fig. 40;

Fig. 39 is a plan view of the parallax disk;

Fig. 40 is a plan view of the arm applied when the engine speed method of fire control is being used;

Fig. 41 is a plan view of the arm used when the indirect method of fire is employed;

Fig. 42 is a view in elevation of the vertical deflection dial used in an alternative form of vertical deflection indicator;

Fig. 43 is a vertical section of the same;

Fig. 44 is a horizontal central section;

Fig. 45 is a view in elevation of the vertical deflection indicator assembly used in the alternative form of my invention;

Fig. 46 is a schematic diagram of the operating mechanism;

Fig. 48 is a detail showing the mounting of the vertical deflection dial operating handle.

Figure 1:
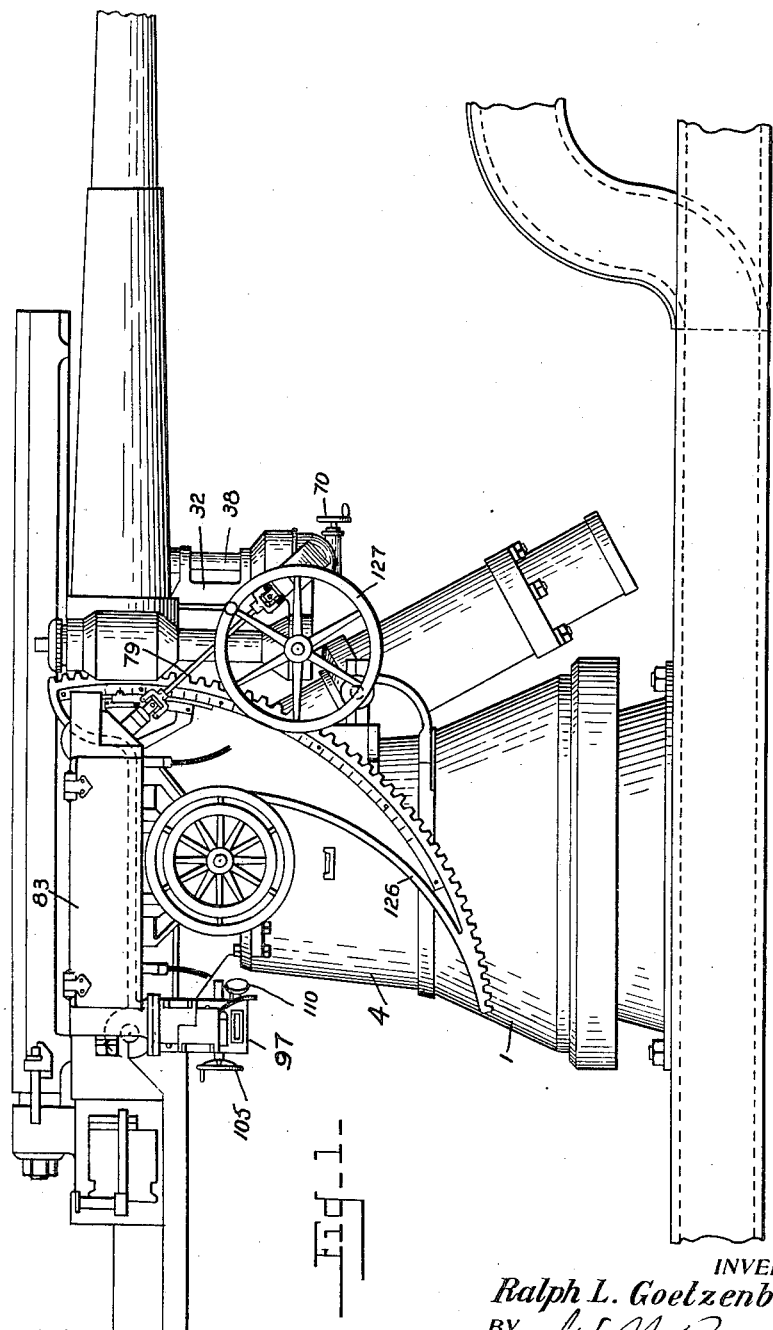
Fig. 1 is a side view showing the elevational devices of a gun equipped with a sighting mechanism constructed in accordance with my invention.
Figure 16:
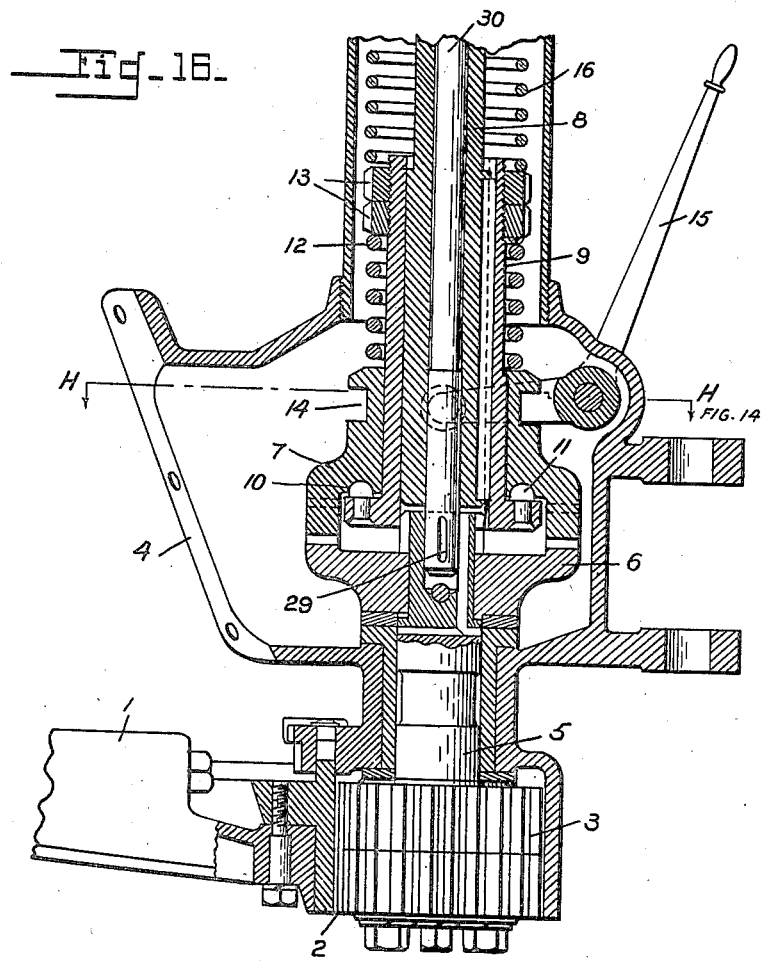
Fig. 16 is a longitudinal section of the traversing clutch assembly.
Figure 17:
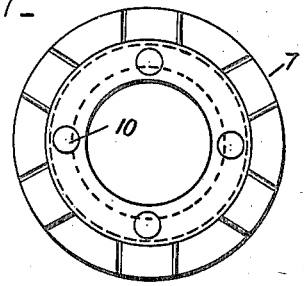
Fig. 17 is a bottom plan view of the upper clutch member.
Figure 18:
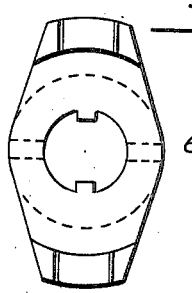
Fig. 18 is a plan view of the lower clutch member.

Referring to the drawings by numerals of reference:

In carrying out my invention I provide a gun carriage 1, having, as usual, a stationary annular rack 2 (Figs. 3 and 16) formed on its base with which meshes a pinion 3 through which the upper carriage is rotated to traverse the gun. The pinion is housed in a suitable casing 4 and is attached to a shaft 5 journaled in the casing and driven through any suitable means such as the clutch elements 6 and 7, the lower clutch element 6 being fast on the shaft. The element 7 is preferably mounted on a sleeve 9 which surrounds the hollow shaft 8 and is feathered thereon and has spaced apart recesses 10 formed in its face into which projects bosses 11 carried by a flange of the sleeve. The element 7 is held in contact with the flange by means of a coil spring 12 which may be tensioned by nuts 13, threaded on the sleeve 9. This structure permits the clutch element to yield when subjected to excessive strain. For the purpose of actuating the clutch an annular groove 14 (see Figs. 14 and 16) is formed therein into which project studs formed on the Y end of a bell crank lever 15 fulcrumed in the casing, the other end of which lever is provided with a hand grip for manually operating the same. A coil spring 16 surrounds the hollow shaft 8 and rests on the nuts 13 for the purpose of retaining the clutch structure in normal position.

Figure 11:
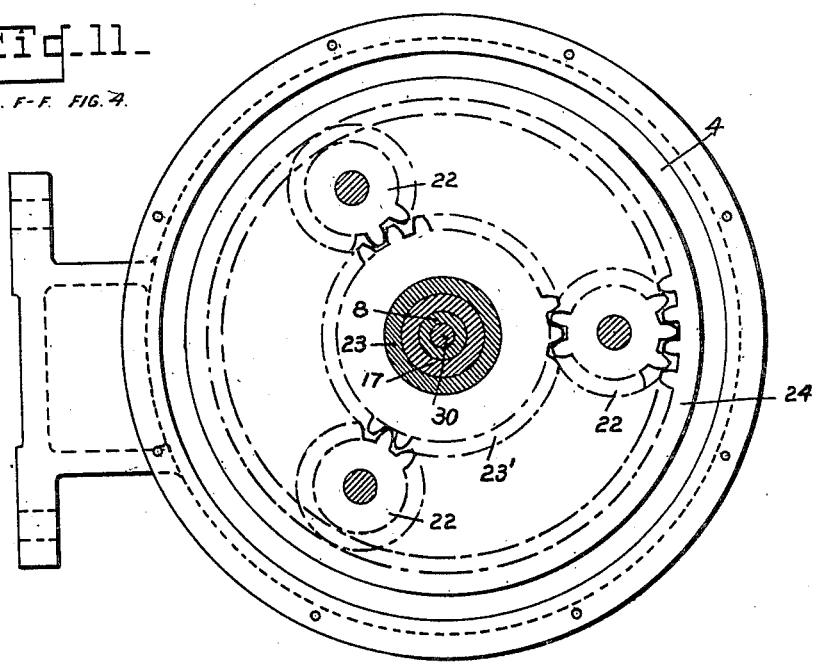
Fig. 11 is a sectional view taken on the line F—F of Fig. 4.
Figure 12:
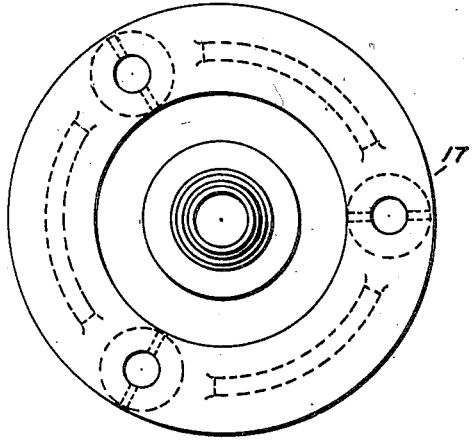
Fig. 12 is a plan view of the traversing differential gear spider.
Figure 13:
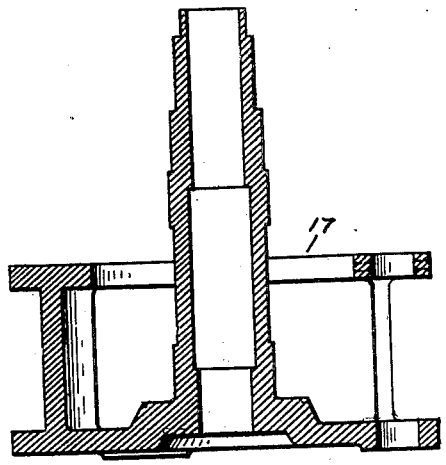
Fig. 13 is a longitudinal section of the same.

To provide means for rotating the hollow shaft 8, and traversing the gun, a spider 17 (see Figs. 4, 11, 12 and 13) is mounted on the upper end thereof to rotate thereon and to the tubular stem of this spider is keyed a worm wheel 18 (see Figs. 4 and 7) which meshes with a worm 19 carried on a shaft 20 journaled in the upper part of the casing 4 and rotated through the hand wheel 21 or otherwise. Carried by the spider 17 are pinions 22 (see Figs. 4 and 11) which mesh with an external gear 23' formed on a sleeve 23, which surrounds the stem of the spider and is rotatable thereon, and these pinions 22 also mesh with the internal gear carried by a member 24 which is keyed to the hollow shaft 8. The sleeve 23 has keyed thereon a worm wheel 25 (see Figs. 4 and 9) which meshes with a worm 26 carried on a shaft 27 journaled in the casing 4 and rotated through a hand wheel 28 or otherwise.

Rotation of the traversing handwheel 28 will rotate the worm wheel 25 through worm 26, thus causing rotation of sleeve 23, to which the wheel is keyed. As gear 23' on sleeve 23 meshes with the pinions 22, rotation of the sleeve will cause rotation of the pinions about their axes. The pinions during this movement are held against rotation about the sleeve 23 through worm wheel 18 which is keyed to the spider 17 and meshes with worm 19. Rotation of the pinions 22 then will impart rotation to the member 24, since the pinions mesh with the internal gear on such member and also to hollow shaft 8 to which the member 24 is keyed. Rotation of the hollow shaft 8 causes rotation of the pinion 3 and through the pinion the gun is traversed. The handwheel 28, hence, is employed not only to traverse the gun during initial laying so that it may be directed at the proper angle with respect to the base line, but also to continuously follow, by virtue of the sight, the azimuthal movements of the target.

In laying the gun to the predicted future position of the target, however, it is necessary that some means be provided whereby the proper lateral deflection corrections may be set off. The setting of these corrections may be accomplished by rotation of handwheel 21, shaft 20 and worm 19 thereby imparting rotation to the worm wheel 18. Since worm wheel 18 is keyed to the spider 17 the spider will be caused to rotate so that pinions 22 will revolve about the sleeve 23 and, since this sleeve is locked against rotation due to rotation of the pinions 22 about the sleeve by the worm wheel 25 and worm 26, the rotation of the handwheel 21 will be algebraically added through the member 24 to that movement of the shaft 8 caused by rotation of handwheel 28. In practice, of course, it is to be understood the handwheels 21 and 28 may be rotated simultaneously and the settings made simultaneously.

Adding the lateral deflection corrections to the movement of the gun will move the gun from its normal position with respect to the target and this movement, were no means provided to prevent same, would naturally be imparted to the sight also, thereby interfering with the attendant sighting the gun and drawing the sight off the target. To prevent this interference and allow the sight to remain on the target while moving the gun ahead of the target, which is one of the objects of the inventon, mechanism such as hereinafter described has been employed.

Figure 2:
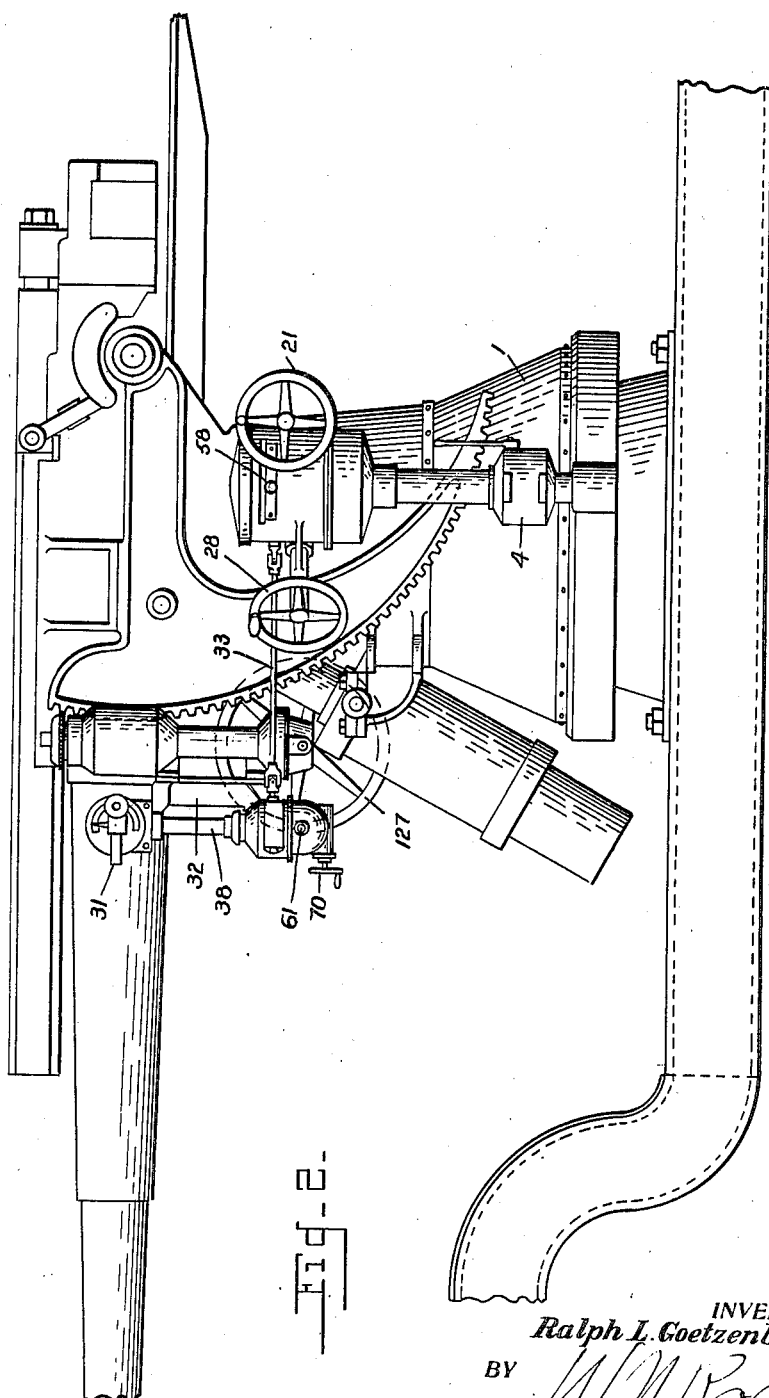
Fig. 2 is a similar view taken from the opposite side showing the azimuthal devices.

Mounted on the worm wheel 18 so as to move therewith is a ring 34 (see Figs. 4 and 7) having a suitable gear cut thereon with which meshes a pinion 35, fast on one end of a shaft 33, on the other end of which shaft (see Figs. 2 and 19) is a worm 36 which meshes with a worm wheel segment 37 formed on a member 59 which member is keyed to hollow shaft 38, journaled in the sight bracket 32 and having mounted on its upper end the sight 31. It will be noted that the sight is offset from the axis of hollow shaft 38, so that it revolves about such axis. The offset of the sight from the axis and proportion of the gears bear a relation such that, as the gun is turned through an angle equal to the deflection correction, the sight is turned in the opposite direction an amount equal to the same angle measured from the same center; namely, a point in the axis of rotation of the gun. From this it will be seen that during the additional movement in traverse imparted to the gun through rotation of the hand wheel 21 the sight has remained stationary with respect to the target and, consequently, trained thereon at all times.

It is to be further noted that, as the hollow shaft 38 is rotated through the worm 36 and worm wheel segment 37 to move the sight, the casing 60 and the end of the shaft 61 to which is affixed the segmental gear 62 together with the segmental gear 63 and shaft 64 will rotate in unison with the hollow shaft 38, this being permitted by reason of the universal joint, so that no movement in elevation of the sight will be had by reason of its movement in azimuth.

Any suitable indicating mechanism may be used for the purpose of enabling the attendants operating the gun to properly perform their various duties, the specific form of such indicators forming no part of the present invention.

The mechanism employed in laying the gun in azimuth i. e. the mechanism used in setting off the main and secondary traverse or lateral deflection corrections will first be described. This mechanism includes (see Figs. 4, 6 and 8) a pinion 54 secured on the stem of the spider 17 and meshing with a segmental gear 54' journaled on a stub shaft 50', mounted in the head 42 of the casing, that gear carrying preferably integral therewith, a semi-circular arc 53 provided with suitable graduations, herein shown in mils for the main traverse deflection corrections. Mounted on the same stud shaft is a segment 55 capable of adjustment within limits through the instrumentality of a pinion 57, which meshes with a rack formed in the under surface of the segment, the pinion being mounted on a shaft journaled in the casing and rotatable through a knurled thumb knob 58. An arcuate member 56 engraved with a plus and minus scale of traverse secondary deflection corrections is associated with the segement 55 in such a position that the reference line on the segment may be set to the desired graduations on the member 56 through manipulation of the thumb knob and pinion just described. The secondary traverse deflection corrections, then are set off by moving the index of the segment with respect to the scale 56, while the main traverse deflection corrections are set off by rotating the handwheel 21 until the proper setting has been laid off on the arc 53 as read against its index on the segment. The main and secondary traverse deflection corrections are then algebraically added together. When the handwheel 21 is rotated to set off the main correction the spider 17, pinion 54 and arc 53 are moved and simultaneously also the gun is traversed an amount equal to the algebraic sum of the main and secondary traverse deflection corrections.

When the handwheel 21 is rotated to set off the main and secondary traverse deflection corrections as above described, the sight is kept on the target through the mechanism of the ring 34, pinion 35, shaft 33, worm 36, segment 37 and shaft 38 as already described. From the foregoing it will be seen that as the gun is laid in azimuth the sight may follow the target in azimuth. But provision must also be made for enabling the sight to follow the target in elevation during elevation of the gun. The specific mechanism for accomplishing this and the elevational indicating mechanism shown herein by way of illustration, will now be described.

The hand wheel 70 (Figs. 3 and 19) is mounted on a shaft 71 journaled in the sight casing and having formed thereon a worm 72 which meshes with a worm wheel 73 fast on a shaft 74, which shaft is also journaled in the sight casing. Shaft 74 is connected by a train of gears 75 with a shaft 61 journaled in the sight casing and formed of two sections joined by a universal joint, centered in prolongation of the axis of rotation of shaft 38 as shown. Fast on the shaft 61 is a segmental gear 62 meshing with a similar gear 63 which is keyed to the lower end of a shaft 64 which extends through the hollow sight shaft 38 and which has secured on its upper end a segmental gear 65 which meshes with a similar gear 66 fast on the shaft 67 upon which the telescope 31 is mounted. To prevent backlash and lost motion the spiral spring 68, one end of which is secured to the sight casing by rivets or otherwise and the other end of which is secured to a pin 69 which is fastened in and projects from the gear 66, is provided. From the foregoing it is evident that rotation of the handwheel 70 will cause rotation of shafts 74 and 61, and through that movement of shafts 64 and 67, thereby rocking the sight in elevation.

Figure 3:
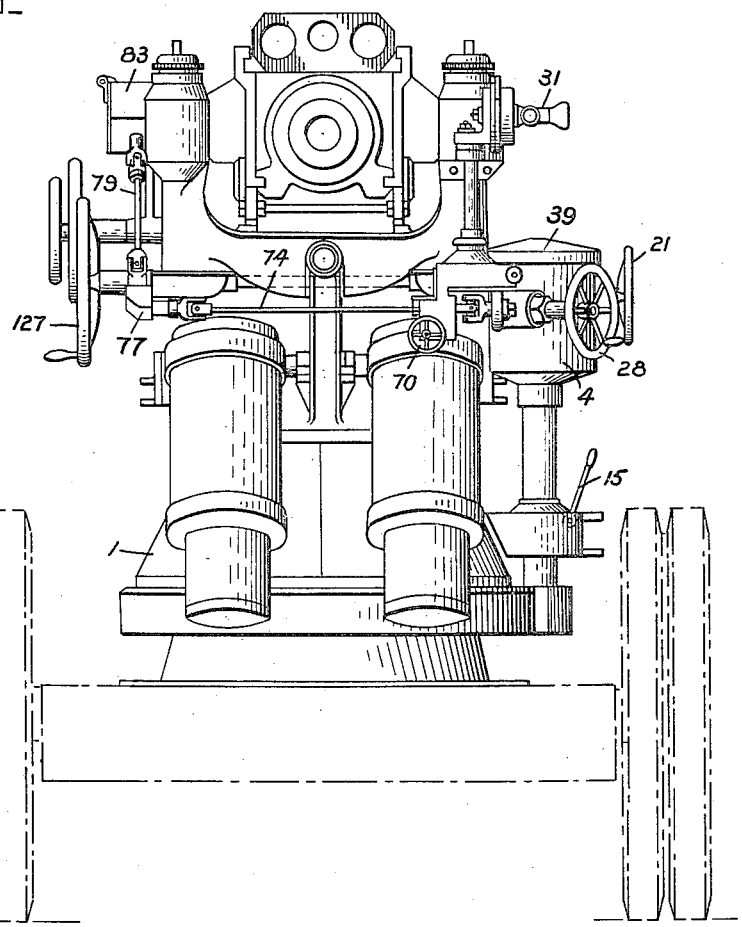
Fig. 3 is a front view of the same.

As will appear most clearly from Fig. 3 the shaft 74 is extended across the front of the gun carriage and has its other end (see also Fig. 10), journaled in a suitable casing 77, hung from the gun carriage, and on this end is secured a beveled pinion 76 which meshes with a pinion 78 carried on one end of a shaft 79 on the other end of which is secured a pinion 80 (see Fig. 33) which meshes with a beveled gear 81 fast on a shaft 82 journaled in a drum housing 83, which is secured to the gun carriage (see Fig. 1). From this it is apparent that rotation of the hand wheel 70 to elevate the sight causes rotation of the shaft 82. Drum head 84 of a drum 85 has a running fit against shaft 82, that is, can be rotated about the shaft. Upon drum 85 is rolled an abacus of curves 86 (see Fig. 26) of equal fuse range or settings plotted in function of angles of sight as ordinates and angles of quadrant elevation as abscissæ.

Toward the opposite end of the shaft 82 (see Figs. 26 and 31) an internally geared member 87 is keyed which meshes with pinions 88 mounted on a spider 89 fast on a sleeve 90 which surrounds the shaft. These pinions also mesh with a gear 91 integral with that end of the drum head. A housing 92 is secured to this head of the drum enclosing a spiral spring 93 (see also Fig. 30) so positioned that one end is anchored to this drum head and the other end made fast to the sleeve 90 so that lost motion and backlash is avoided. When the hand wheel 70 is rotated, then, to keep the sight on the target, not only is the sight moved but simultaneously also the shaft 82, as above described, which causes rotation of the geared member 87 pinions 88 and gear 91 causing rotation of the drum 85.

In order to permit elevational laying of the gun for indirect firing, the lower set of graduations on drum 101 are employed in connection with curves 86 of either altitude or fuse range on drum 85. In addition, drum 85 has a set of peripheral graduations in altitude which register against pointer 188 (Fig. 26). These, in combination with an abacus of fuse range, also permit laying of the gun to quadrant elevation. In utilizing these means for arriving at quadrant elevation, the sight must either be held at zero or its transmission totally disconnected from the drum 85. This is possible of accomplishment by disengaging the cross shafting 74 or 79 at the couplings. Then by turning handwheel 105 and bringing thereby the lower of pointers 131 to the proper graduation of angle of sight of lower spiral scale 102, drum 85 will be rotated proportionally. Depending upon whether the use of the function fuse range or altitude is combined with angle of sight to determine quadrant elevation that corresponding abaci 86 is selected and traveling pointer 119 brought to coincidence with the particular curve announced by manipulation of the main elevating handwheel 127 of the gun. If the peripheral scale of altitude is used, hand wheel 105 is again turned until the proper graduation of altitude is registered against pointer 188. Traveling pointer 119 by virtue of rotating elevating handwheel 127 is brought to the curve corresponding to the announced value of fuse range an abacus of which envelops drum 85. The quadrant elevation will then have been established.

As in the case of determining the quadrant elevation of the gun for direct firing, the rotation of knob 110 controlling scale 132 introduces the secondary vertical deflection corrections into the system.

Secured on the sleeve 90 is a worm wheel 94 (see Figs. 26, 27 and 28) which meshes with a worm 95 fast on a shaft 96. The shaft 96 extends into a depending portion 97 (see also Fig. 1) of the drum casing; the shaft being journaled therein as well as in the drum casing (see Figs. 28 and 29). Upon this shaft and toward its lower end is mounted a beveled gear 98 meshing with pinions 99 mounted in a worm wheel 100 on which is secured a cylinder 101 provided with graduations 102. The worm wheel 100 meshes with a worm 103 mounted on a shaft 104 (see Fig. 29) and rotated by hand wheel 105. The special scale 102 formed on the cylinder 101 contains two sets of graduations, the upper set being those used in setting the vertical travel deflection corrections, the lower set employed when setting angle of sight to the predicted future position of the target. Slider 131 is guided in the grooves of the spiral and bears an upper and lower reference pointer *a* to register respectively against the corresponding scale. These scales, namely, vertical deflection corrections and angle of sight are used alternately depending upon the system of fire employed.

Also meshing with pinions 99 is a gear 106 loose on the shaft 96 and formed on or secured to a worm wheel 107 which meshes with a worm 108 (see Fig. 27) formed on a shaft 109 provided with a knurled knob or wheel 110 by means of which the shaft may be rotated. Integral with worm wheel 107 is scale 132 having graduations for settings of secondary (arbitrary) vertical deflection corrections against pointer 133.

Movement of the worm wheel 100 rotates through the pinions 99 the beveled gear 98 and shaft 96. Rotation of the shaft 96 through the worm 95 and worm wheel 94 causes rotation of the sleeve 90 pinion 88 and gear 91 thus rotating the drum 85 and adding algebraically to that rotation of the drum caused by rotation of the handwheel 70, as above described. Rotation of the handwheel 70 transmits the angle of sight to the present position of the target; by rotating handwheel 105, the vertical travel correction is added algebraically with the result that the drum 85 is rotated to an angle proportional to the angle of sight to the predicted future position of the target. Rotation of the worm wheel 107 likewise causes a rotation of the beveled gear 106 which through the pinions 99 and beveled gear 98, results in the rotation of the shaft 96, causing an additional rotation of the drum 85 proportionate to the setting of the scale 132 against the pointer 133.

So that the parts may operate with a great degree of accuracy means are provided for taking up lost motion, one form of such means being illustrated in Figs. 29 and 34 wherein the shaft 104 is shown as surrounded by a sleeve 111 in which is housed a coil spring 112 and on which is formed one-half of the worm 103, the sleeve being feathered to the shaft by a key 113 so that the two sections of the worm, namely, the one fast on the shaft and the one formed on the sleeve may be drawn apart by the tension of the spring thus keeping the worm at all times firmly in contact with the teeth of the worm wheel. Movement of the shaft in either direction is limited and the means therefor, as herein illustrated, consists of clutch members 114—114 (see Fig. 29) fast at either end of an extending threaded portion 115 of the shaft and adapted to engage a clutch member 116 which is internally threaded to engage the screw threads of the portion 115 and which is restrained from angular movement by slotting its upwardly projecting portion 117 to engage a guide plate 118 secured in the shaft housing.

Figure 47:
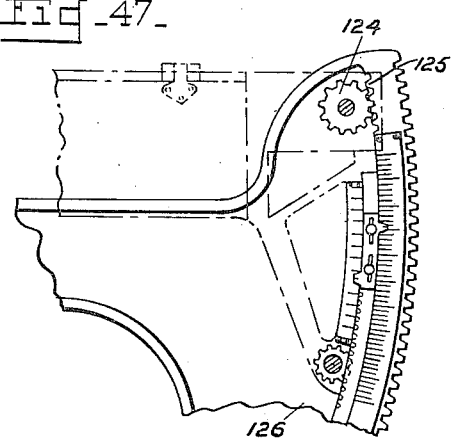
Fig. 47 is a fragmentary view in elevation, particularly in section, of the elevating rack.

Associated with the drum 85 is a pointer 119 (see Figs. 26, 30 and 31) attached to a nut traveling along screw 120, upon one end of which screw is secured a pinion 121 (Figs. 26 and 32) meshing with a beveled gear 122 carried on a shaft 123 journaled in and extending transversely of the drum casing. Upon the extended end of the shaft 123 is mounted a pinion 124, preferably split, the parts of which are spring actuated to eliminate back lash. This pinion meshes with a rack 125 carried by the elevating rack 126 (Figs. 1 and 47) which elevating rack is operated in the usual way through manipulation of the hand wheel 127 which drives through pinion 128 (see Figs. 22, 23, 24 and 25) and gear 129 and worm 130 engaging the rack.

It will thus be seen that as the gun is elevated the pointer 119 is moved longitudinally of the cylinder which is at the same time being rotated as heretofore described. The curves appearing upon the cylinder are those of equal fuse range or setting and, therefore, if the pointer 119 is brought to register the announced curve the gun will have been given the proper quadrant elevation and will be properly laid in elevation. During the laying of the gun, however, the sight at all times follows the target as already described.

To enable proper reading of the fuse range curves on the drum 85 a glass window 180 (Fig. 26) may be inserted in the housing 83. For night firing a light 181 (Fig. 29) is provided so that the correct setting of the scales 102 and 132 may be made.

Heretofore it has been customary to make all the mathematical and mechanical calculations necessary for computation of the firing data at the battery commander's station, thence transmitting the necessary data to the guns where it was laid off. To make possible the scoring of a hit, when the target is a moving object however it is essential, that as little time as possible elapse between the moment of observation and the moment of firing the gun i. e. that the dead time be reduced to a minimum. In order to eliminate a portion of this dead time I have found it desirable to provide means at the gun for mechanically calculating the secondary lateral and vertical corrections due to wind or parallax, thus eliminating to a certain extent the time heretofore consumed in mathematical or mechanical calculations at the battery commander's station. Any suitable mechanism may be provided for this purpose. As shown I preferably employ a disk 44 (Figs. 4, 15 and 39) which has secured upon its periphery an azimuth scale 46 adapted to be set with relation to a reference pointer 47 which pointer is secured to the casing 4, in agreement with the azimuth scale of the gun carriage (not shown). Immediately below the disc 44 is mounted a plate 43 formed with a tubular stem threaded exteriorly to engage with the threaded tapered end of a clamping member 45, which member when threaded on the stem enters a tubular extension of the drum 44 clamping the two discs so as to move together. While a specific structure for clamping the plates 44 and 43 has been shown and described herein, it is to be understood that this form is only presented by way of illustration and not as a limitation, as many structures for accomplishing the same result would readily occur to those skilled in the art. At its lower end (see Fig. 16) the shaft 30 has a splined connection 29 with the pinion shaft 5 so that rotation of the pinion 3 will be imparted to shaft 30. If, then, the azimuth scale of the disc 44 has been set in relation to pointer 47 so as to conform to the azimuthal setting of the gun and the clamping member positioned so as to clamp the disks 43 and 44 together, the setting of the gun in azimuth at any instant, as the sighter follows the target, may be read directly from the scale 46. To correctly set the scale 46 initially the cover 39 of the casing may be removed and the setting accomplished by hand, the clamping member 45 being threaded off sufficiently to allow the drum 44 to turn freely when the same may be turned by hand to the proper setting and clamped in such position by again threading the clamping member on.

Immediately above the disc 44 is an abacus dial 48, (see Figs. 4, 15 and 39) formed with an interiorly threaded tubular extension, into which may be threaded a clamping nut 49 which clamps this dial to rotate with disc 44. About the periphery of the dial 48 are engraved scales 52, herein shown as graduated in mils, to provide for the direction of the wind. When the necessary information is received from the battery commander as to the wind orientation the clamping nut 49 is loosened and the dial 48 is turned to move its zero setting from coincidence with the zero setting of the azimuth scale by an amount equal to the wind orientation and the nut is again clamped in place whereupon the disc and dial will rotate in unison.

Upon the edge of disc 44 is mounted a reference pointer having points 50 and 51 which register respectively, against the inner and outer scales 52. These scales 52 as herein shown are offset 500 mils apart so that one of the reference pointers will always be visible though the other may be hidden under the lateral or vertical arm. This double reference pointer is slidable on the azimuth disc 44 but has sufficient frictional contact therewith to travel with it. This pointer is used for indicating the wind direction.

Upon the dial 48, as above stated, is engraved the abacus of correction curves 52' (see also Fig. 39), those on one side of a diameter being plus and those on the other side minus. Above the dial 48 (see Fig. 15) is mounted the particular secondary correction scale arm 178 to be employed, depending on the method of fire control being used to compute the main deflection corrections, i. e., the corrections due to travel of the target. There are three sets of these arms (see Figs. 15, 40 and 41) two of which—real speed, engine speed, interchangeable and used, respectively, when the angular travel, linear speed methods of fire control are employed. The third, parallax, is utilized in computing at the gun the correction for non-coincidence between the fire control station and the gun emplacement as required in indirect firing. The three arms are of similar construction and operate in the same manner, the graduations thereon being calculated for the particular equations to be resolved under the conditions prevailing when the arms are used.

In resolving the wind corrections for the real speed method, the lateral arm has a scale 179 thereon logarithmically graduated for wind velocity and on this arm is an intermediate slider 175 bearing graduations in logarithms of range and a main slider 176 formed with a pointer 177 which registers against the curves of the dial 48. In operating, the intermediate slider 175 is moved to the proper indication on the wind velocity scale of the lateral arm and the main slider to the proper range setting. The dial 48 having previously been oriented with reference to pointers 50 and 51 in accordance with the wind direction, turns continuously through the same azimuthal angle as the gun. The curves 52' marked on dial 48 are those corresponding to the amounts of the corrections. They are read with respect to pointer 177 in this case.

The vertical arm contains a scale graduated in logarithms for wind velocity upon which slides an intermediate slider 175' having graduations in logarithms for altitude and a main slider 176' which also carries a pointer 177' adapted to register against correction curves 52'. The vertical arm is 90° in advance of the lateral arm. By sliding the intermediate scale to proper wind velocity setting and the main slider to proper altitude setting, the pointer registers the amount of vertical wind corrections. These corrections, also, like the lateral wind deflection correction obtained as described above, will be set off on the appropriate secondary scale, heretofore described and the gun laid accordingly.

The mechanism above described is also representative of operations required on the engine speed method arms in computing its wind corrections and the parallax computing arms.

While I have described a particular mechanism by which the secondary lateral and vertical deflection wind and parallax corrections may be resolved at the gun, it is to be understood that I do not desire to limit myself to the use of the specific mechanism shown and described, since this mechanism may be varied within wide limits without altering this function of my mechanism. It is to be understood, further that while these secondary corrections will, preferably, be made at the gun on mechanism of the type shown and described, if conditions warrant, the gun may be laid with settings based on similar calculations made at the battery commander station and transmitted thence to the gun as has heretofore been described.

In the modification shown in Figs. 42 to 46 inclusive, the traversing mechanism is the same as heretofore described. The sight is mounted in the same way and the connection from the sight to the opposite side of the gun remains the same.

The elevation drum 85 and its associated mechanism is replaced by a main dial 134 and super-elevation dial 135. The main dial conveniently consists of a casing 136 in which is mounted a graduated disk 137, the graduations, as herein shown, being in mils and reading from 0 to 16, each division representing 100 mils. Around the periphery of this disk gear teeth are formed which mesh with the teeth of one element of a train of gears 138 which drive a small disk 139 also mounted in the casing and graduated in mils from 0 to 100, the gear being so proportioned that the small disk 139 makes 16 revolutions to each revolution of the main disk 137. Mounted in a depression in the rear face of the disk 137 and free to turn therein is a disk 140 engaged with the main vertical deflection scale and bearing suitable graduations the ones herein shown reading from 0 to 1000, the 500 graduation being the normal setting of the disk. Disk 141 is mounted in a circular depression formed in the front face of the disk 137 which may be rotated with respect to disk 141 which has sufficient frictional contact to turn therewith when shaft 143 is turned. For convenience in rotating disk 137 with respect to the disk 141 a knob 142 may be provided which is mounted on a shaft 182, carrying a pinion 183 adapted to move in an arcuate slot 184 formed in the disk 137 and to engage with a segmental gear 185 formed on said disk 137. Secured intermediate the ends of the shaft 182 is a disk 186 and a coil spring 187 surrounds the shaft to normally maintain the disk 186 in frictional contact with disk 141. When it is desired to rotate disk 137 with respect to disk 141 the knob 142 is pressed inwardly against the spring 187. The disk 141 which is engraved with the secondary vertical deflection scale, contains graduations of same angular displacement as those on disk 140.

The disk 141 is secured on the shaft 143 which shaft is journaled in the casing 136 and secured on said shaft by means of a pin or otherwise is a gear 144 which meshes with a gear 145 carried on one end of a shaft 146, on the other end of which is mounted a beveled gear 147 meshing with segmental gear 148 secured to the trunnion of the gun cradle, so that as the gun is moved in elevation the disk 141 and with it the disk 137 is rotated.

The disk 140 has secured thereto a beveled gear 149 which provides one element of differential gear train 150, the ring gear 151 of which train meshes with a gear 152 mounted on one side of shaft 74. The gear 153 of the differential train is in mesh with a pinion 154 carried on one end of shaft 155 on the other end of which is a gear 156 meshing with a gear 157 mounted on the shaft 158 on which the super-elevation disk 135 is carried. This disk 135 and shaft 158 may be rotated through means of a hand wheel 159, the shaft 160 of which has a worm mounted thereon meshing with a worm wheel 161 fast on the shaft 158.

The super-elevation dial 135 has engraved thereon curves of fuse range and over these curves moves radially a pointer 162, the pointer being mounted to reciprocate in a housing 163, the reciprocation being conveniently accomplished through means of a rack 164 formed on the pointer which engages the teeth 165 meshing with a segmental gear 166 secured to and moving with the trunnions.

In laying the gun for elevation in this form of my invention the disk 137 will be moved by means of knob 142 to set off the announced secondary vertical correction.

Meanwhile the attendant sighting the gun turns the angle of sight hand wheel 70 to elevate his sight and keep the same on the moving target. In doing so, he rotates the shaft 74 through rotation of shaft 71 worm 72 and worm wheel 73 thereby rotating the gear 152, ring gear 151, gear 149 of the differential gear train 150 which causes rotation of the disk 140 and displaces the reference line carried by disk 137 with respect to the 500 division of the disk 140. The gun pointer then elevates the gun to bring the reference line to the displaced 500 division of disk 140. This is accomplished through gear 148 on the trunnion driving beveled gear 147, shaft 146, gears 145 and 144, thereby rotating shaft 143 and disks 141 and 137; the disk 137 rotating in unison with the disk 141 by reason of the frictional contact between them. This operation elevates the gun to the same elevation as that given to the sight.

The graduations appearing on the disk 140 correspond to the vertical travel deflection correction. The gun pointer has transmitted continuously to him, usually from the battery commander's station, the amount of this correction. He manipulates the gun elevating handwheel until the reference line on disk 137 is brought to alinement with the graduation on disk 140 corresponding to the announced value of the vertical travel correction.

At the same time as the operations explained in the two preceding paragraphs are being accomplished, an attendant rotates handwheel 159 to displace super-elevation dial 135 until the announced curve of fuse range falls below the pointer 162. In displacing the dial 135 he rotates shaft 158 and through gears 157, 156, and shaft 155 will cause through pinion 154 a rotation of the differential gear train 150 and disk 140, thereby tending to displace the disk 140 from its former setting with relation to the reference line of disk 137 so that the gun pointer will again be compelled to change the elevation of the gun to bring the reference line on disk 137 to the proper setting with relation to disk 140. When these operations have been accomplished the gun will have been correctly laid in elevation. The laying in azimuth is accomplished in the manner already described.

As in the elevation mechanism first described, the secondary vertical deflection corrections set off on this modified form of my invention may be computed either at the battery commander's station or on the wind or parallax computers hereinbefore described.

If desired a telemeter may be secured to the carriage so as to enable the determination of fuse range without reference to the battery commander's station. This instrument is intended merely for emergency use, for example, when communication of fuse range from the battery commander's station is interrupted. This instrument which forms no part of the present invention consists preferably of a sector 167 engraved with curves of fuse range and an alidade 168 graduated in reading of altitude or angle of sight. The sector and alidade are mounted so as to be movable relative to each other and either of these elements may be mounted upon the trunnions so as to move therewith. A pointer 169 at the outer end of the arm of the alidade serves to indicate against the graduated elevation scale 170, giving the elevation of the gun at any moment. The alidade is provided with a scale graduated in altitude against which a slider 172 may be set off. The slider is provided with indices 173 which serve to indicate the proper fuse range with respect to the curves 171 of sector 167. The alidade may be supported by an arm 174 and is as above stated to be generally considered merely an emergency means of resolving fuse range at the gun.

With a gun provided with a sight of the structure described and equipped with the azimuthal laying mechanism described and elevational laying apparatus of either type described, it is possible to quickly and accurately lay a gun in azimuth and elevation for the predicted future position of the target, while at the same time retaining the sight on the present position of the target. Means have been provided, moreover, for resolving the secondary azimuthal and vertical wind and parallax deflection corrections at the gun so that the time ordinarily consumed by the otherwise necessary mathematical or mechanical calculations at the battery commander's station is done away with, dead time diminished and the firing speeded up. The decrease in the dead time made possible by the invention described will make possible more rapid laying and fire on a moving target than with any other system heretofore employed and will render anti-aircraft artillery a more valuable asset in defense against aerial attack.

It will be noted that while I have described my invention in connection with certain specific forms of gear transmission, that it is by no means intended to limit the invention to these forms only, since other transmissions accomplishing the same results may be employed and indeed for gear transmission, steel bands or pulleys or similar apparatus may be substituted. Instead of the specific indicating dials or drums described, moreover, similar suitable dials or drums may be employed without altering the function of my device and I do not here wish to be limited to the particular mechanism disclosed.

I claim:

1. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional movement to the gun carriage and simultaneously to the sight in an opposite direction and mechanism associated with the traversing mechanism and operable thereby for resolving and indicating the algebraic sum of the traversing movement and the additional movement imparted to the gun.

2. The combination with a gun carriage, of a sight mounted to normally move in traverse in unison with a gun carriage traversing mechanism for the gun, mechanism associated with the traversing mechanism and operable simultaneously therewith and independently thereof for imparting additional movement to the gun and simultaneously to the sight in an opposite direction, mechanism operable by the last named mechanism for indicating the amount of traversing movement caused by actuation of said last named mechanism, and means associated with the traversing mechanism and operable thereby for resolving and indicating the algebraic sum of the traversing movement and the additional movement imparted to the gun.

3. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional movement to the gun carriage and for simultaneously moving the sight in an opposite direction, mechanism associated with the traversing mechanism and operable thereby for indicating the algebraic sum of the traversing movements of the gun carriage and mechanism associated with the indicating mechanism for resolving secondary lateral and vertical wind and parallax deflection corrections at the gun.

4. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional movement to the gun carriage and to the sight in an opposite direction, means adapted to indicate the algebraic sum of the traversing movements of the gun carriage, an indicator carried by such indicating means, a scale adapted to be set independently of said indicating means according to known data and when set read against the indicator whereby the secondary lateral and vertical wind and parallax deflection corrections may be resolved at the gun.

5. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional movement to the gun carriage and to the sight in an opposite direction, means adapted to indicate the algebraic sum of such movements, an indicator carried by such means, a scale adapted to be set independently of said means according to known data and when set read against the indicator whereby the secondary lateral and vertical wind and parallax deflection corrections may be resolved at the gun and means for locking the scale and indicating means so as to move together.

6. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional traversing movement to the gun and simultaneously moving the sight in an opposite direction, means adapted to indicate the algebraic sum of such traversing movements, an indicator carried by said means, a pair of scales, indicators adapted to be set on the scales according to known data, a dial engraved with a family of correction curves adapted to be rotated for purpose of orientation, pointers or indicators for registering against said curves whereby the secondary lateral and vertical wind and parallax deflection corrections may be resolved at the gun.

7. The combination with a gun carriage, of a rotatable shaft, a sight mounted in offset relation to the axis of rotation of the shaft and rotatably mounted upon the shaft, mechanism for traversing the gun carriage and simultaneously moving the sight in an opposite direction, a second shaft rotatably mounted with respect to the first shaft, mechanism for rotating the sight with respect to the first shaft on rotation of the second shaft and mechanism for rotating the second shaft.

8. The combination with a gun carriage, of mechanism for traversing the gun carriage to apply lateral deflection correction to the gun, a rotatable hollow shaft, a sight carried by the shaft and offset with respect to the axis of rotation of the shaft, means connected to the traversing mechanism and operable therewith for rotating the shaft in an opposite direction, a rotatable shaft mounted within the hollow shaft, means for transmitting rotation of the second shaft to the sight to move the sight in a vertical plane and means for rotating the second shaft.

9. The combination with a gun carriage, of mechanism for traversing the gun carriage to apply the lateral deflection corrections to the gun carriage, a hollow shaft, a sight mounted in offset relation with respect to the axis of rotation of said shaft, means connected to the traversing mechanism and operable therewith for rotating the shaft in an opposite direction, a rotatable shaft mounted within the hollow shaft, means for transmitting rotation of the second shaft to the sight to move the sight in a vertical plane, means for rotating the second shaft and means adapted to be actuated by said last named means for indicating the amount of said rotation.

10. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional traversing movement to the gun carriage and simultaneously moving the sight in an opposite direction, means operable by such mechanism for indicating the amount of such movement, means associated with the traversing mechanism and operable thereby for indicating the total traversing movement, means for moving the sight in elevation and means actuated by the last named means for indicating the amount of such movement.

11. The combination with a gun carriage, of a supporting member rotatably mounted upon the gun carriage, a sight carried by the supporting member and offset with respect to the axis of rotation of the supporting member, a shaft, cooperating means on the shaft and gun carriage adapted on actuation of the shaft to traverse the gun carriage, a spider rotatable on the shaft, an externally geared member rotatable on the spider, an internally geared member connected to the shaft, a pinion rotatably mounted on the spider adapted to mesh with the externally and internally geared members, means for rotating the externally geared member to traverse the gun, means for rotating the spider for imparting additional traversing movement to the gun, mechanism operable on actuation of the last named means for simultaneously moving the sight supporting member in an opposite direction, mechanism for moving the sight in a plane at right angles to the axis of rotation of the supporting member and means operable by the last named mechanism for indicating the amount of such movement.

12. The combination with a gun carriage, of a sight mounted for lateral and vertical movement with respect to the gun carriage, mechanism for applying lateral deflection correction simultaneously to the carriage and sight, means for registering the angle of sight, mechanism for adding algebraically to the movement of said means a movement equivalent to the vertical deflection corrections, elevating mechanism for the gun carriage, and means actuated by said elevating mechanism for registering against the first named means the quadrant elevation of the gun.

13. The combination with a gun carriage, of a sight mounted for lateral and vertical movement with respect to the gun carriage, mechanism for applying lateral deflection to the gun carriage and simultaneously moving the sight in an opposite direction, means actuated by such mechanism for indicating the amount of such deflection correction, means for moving the sight in elevation with respect to the gun carriage, a scale, means operable by the sight elevating means for moving the scale an amount proportionate to the elevation of the sight, means for adding algebraically to this movement of the scale a movement proportionate to the vertical deflection corrections, elevating mechanism for the gun and an indicating device adapted to be moved by the elevating mechanism to indicate on the scale the quadrant elevation of the gun.

14. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional traversing movement to the gun and simultaneously to the sight in an opposite direction, mechanism for moving the sight in elevation to retain the same on the target, a rotatable scale, mechanism connected to the sight elevating mechanism and operable thereby for moving this scale an amount proportionate to the movement of the sight, means for simultaneously and independently imparting additional movement to the scale proportionate to the vertical deflection corrections, an indicating device, elevating mechanism for the gun and means connected to the elevating mechanism and operable thereby to move the indicating device against the scale.

15. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional traversing movement to the gun carriage and simultaneously moving the sight in an opposite direction, means operable by the last named mechanism for indicating the amount of such movement, means operable by the traversing mechanism for indicating the total of the traversing movement, means for moving the sight in elevation, mechanism operable by the last named means for indicating the amount of such movement, mechanism for adding algebraically to the movement of said indicating mechanism a movement equivalent to the vertical deflection corrections, elevating mechanism for the gun and means connected to the elevating mechanism and operable thereby to indicate against the indicating mechanism the quadrant elevation of the gun.

16. The combination with a gun carriage, of a sight mounted to normally move in traverse in unison with the gun carriage, traversing mechanism for the gun carriage, mechanism associated with the traversing mechanism and operable simultaneously therewith and independently thereof for imparting additional traversing movement to the gun and simultaneously moving the sight in an opposite direction, means operable by such mechanism for indicating the amount of such movement, mechanism for moving the sight in elevation, means operable by said mechanism for indicating the amount of such movement, mechanism for adding algebraically to the movement of said indicating means a movement equivalent to the vertical deflection corrections, elevating mechanism for the gun and means connected to the elevating mechanism and operable thereby to indicate against the indicating means the quadrant elevation of the gun.

17. The combination with a gun carriage, of a sight mounted to normally move in traverse in unison with the gun, traversing mechanism for the gun, mechanism associated with the traversing mechanism and operable simultaneously therewith and independently thereof for imparting additional traversing movement to the gun and simultaneously moving the sight in an opposite direction, means operable by the traversing mechanism for indicating the total traversing movement of the gun, means associated with said last named means and adapted to be set according to known data to indicate against the last named means secondary deflection corrections, mechanism for moving the sight in a vertical plane, means operable by the said mechanism for indicating the amount of such movement, mechanism for adding algebraically to the movement of said indicating means a movement equivalent to the vertical deflection corrections, elevating mechanism for the gun and means connected to the elevating mechanism and operable thereby to indicate against the indicating means the quadrant elevation of the gun.

18. The combination with a gun carriage, of a supporting member rotatably mounted upon the gun carriage, a sight carried by the supporting member and offset with respect to the axis of rotation of the same, a shaft, cooperating means on the shaft and gun carriage adapted on actuation of the shaft to traverse the gun, a spider rotatable on the shaft, an externally geared member rotatable on the spider, a pinion rotatably mounted on the spider and adapted to mesh with the externally and internally geared members, means for rotating the externally geared member to traverse the gun, means for rotating the spider to impart additional traversing movement to the gun. mechanism operable on actuation of the last named means for simultaneously moving the sight supporting member in an opposite direction, mechanism for moving the sight in a plane at right angles to the axis of rotation of the supporting member, means operable by the last named mechanism for indicating the amount of such movement, means for adding algebraically to the movement of such indicating means a movement equivalent to the vertical deflection corrections, elevating mechanism for the gun and means connected to the elevating mechanism and operable thereby to indicate against the indicating means the quadrant elevation of the gun.

19. The combination with a gun carriage, of a supporting member rotatably mounted upon the gun carriage, a sight carried by the supporting member and mounted so as to be movable with relation to the supporting member, a shaft, cooperating means on the shaft and gun carriage adapted on actuation of the shaft to traverse the gun, a spider rotatably mounted on the shaft, an externally geared member rotatable on the spider, an internally geared member connected to the shaft, a pinion rotatably mounted on the spider, and adapted to mesh with the internally and externally geared members, means for moving the externally geared member to traverse the gun, means for moving the spider for imparting additional traversing movement to the gun, mechanism interposed between the last named means and the sight supporting member and operable on actuation of said last named means for moving the sight supporting member in an opposite direction to the movement of the gun carriage, mechanism for moving the sight with respect to its supporting member in a vertical plane and means for actuating said mechanism.

20. The combination with a gun carriage, of a supporting member rotatably mounted upon the gun carriage, a sight carried by the supporting member and mounted so as to be movable with relation to the supporting member, a shaft, cooperating means on the shaft and gun carrriage adapted on actuation of the shaft to traverse the gun, a spider rotatably mounted on the shaft, an externally geared member rotatable on the spider, an internally geared member connected to the shaft, a pinion rotatably mounted on the spider, and adapted to mesh with the internally and externally geared members, means for moving the externally geared member to traverse the gun, means for moving the spider for imparting additional traversing movement to the gun, mechanism interposed between the last named means and the sight supporting member and operable on actuation of the said last named means for moving the sight supporting member in an opposite direction to the movement of the gun carriage, mechanism for moving the sight with respect to its supporting member in a vertical plane, means for actuating said mechanism, and means operable by said last named means for indicating the amount of such movement.

21. The combination with a gun carriage, of a supporting member rotatably mounted upon the gun carriage, a sight carried by the supporting member and mounted so as to be movable with relation to the supporting member, a shaft, cooperating means on the shaft and gun carriage adapted on actuation of the shaft to traverse the gun, a spider rotatably mounted on the shaft, an externally geared member rotatable on the spider, an internally geared member connected to the shaft, a pinion rotatably mounted on the spider and adapted to mesh with the internally and externally geared members, means for moving the externally geared member to traverse the gun, means for moving the spider for imparting additional traversing movement to the gun, mechanism interposed between the last named means and the sight supporting member and operable on actuation of the said named means for moving the sight supporting member in an opposite direction to the movement of the gun carriage, mechanism for moving the sight with respect to its supporting member in a vertical plane, means for actuating said mechanism, means operable by said last named means for indicating the amount of such movement, and means for adding algebraically to the movement of such indicating means a movement equivalent to the vertical deflection correction, elevating mechanism for the gun and means connected to the elevating mechanism and operable thereby to indicate against the indicating means the quadrant elevation of the gun.

22. The combination with a gun carriage, of a supporting member rotatably mounted upon the gun carriage a sight mounted upon the supporting member in offset relation to the axis of rotation of the supporting member and rotatable on the supporting member in a plane at right angles to the path of rotation of the supporting member, a shaft, cooperating means on the shaft and gun carriage adapted on actuation of the shaft to traverse the gun, a spider rotatably mounted on the shaft, an externally geared member keyed to the shaft, a pinion rotatably mounted on the spider and adapted to mesh with the internally and externally geared members, means for moving the externally geared member to traverse the gun, means for moving the spider for imparting additional traversing movement to the gun, mechanism interposed between the last named means and the sight supporting member and operable on actuation of the last named means for moving the sight supporting member in an opposite direction to the movement of the gun carriage, a rotatable member mounted concentric to the sight supporting member, mechanism interposed between the last named member and the sight whereby rotation of the last named member causes rotation of the sight in a vertical plane and mechanism for rotating the last named member.

23. The combination with a gun carriage, of a supporting member rotatably mounted upon the gun carriage, a sight mounted upon the supporting member in offset relation to the axis of rotation of the supporting member and rotatable on the supporting member in a plane at right angles to the path of rotation of the supporting member, a shaft, cooperating means on the shaft and gun carriage, adapted on actuation of the shaft to traverse the gun, a spider rotatably mounted on the shaft, an externally geared member keyed to the shaft, a pinion rotatably mounted on the spider and adapted to mesh with the internally and externally geared members, means for moving the externally geared member to traverse the gun, means for moving the spider for imparting additional traversing movement to the gun, mechanism interposed between the last named means and the sight supporting member and operable on actuation of the last named means for moving the sight supporting member in an opposite direction to the movement of the gun carriage, a rotatable member mounted concentric to the sight supporting member, mechanism interposed between the last named member and the sight whereby rotation of the last named member causes rotation of the sight in a vertical plane, mechanism for rotating the last named member, and means operable by said mechanism for indicating the amount of movement of the sight in a vertical plane.

24. The combination with a gun carriage, of a supporting member rotatably mounted upon the gun carriage, a sight mounted upon the supporting member in offset relation to the axis of rotation of the supporting member and rotatable on the supporting member in a plane at right angles to the path of rotation of the supporting member, a shaft, cooperating means on the shaft and gun carriage, adapted on actuation of the shaft to traverse the gun, a spider rotatably mounted on the shaft, an externally geared member keyed to the shaft, a pinion rotatably mounted on the spider and adapted to mesh with the internally and externally geared members, means for moving the externally geared member to traverse the gun, means for moving the spider for imparting additionl traversing movement to the gun, mechanism interposed between the last named means and the sight supporting member and operable on actuation of the last named means for moving the sight supporting member in an opposite direction to the movement of the gun carriage, a rotatable member mounted concentric to the sight supporting member, mechanism interposed between the last named member and the sight whereby rotation of the last named member causes rotation of the sight in a vertical plane, mechanism for rotating the last named member, means operable by the said mechanism for indicating the amount of movement of the sight in a vertical plane, and means for adding algebraically to the movement of such indicating means a movement equivalent to the vertical deflection correction, elevating mechanism for the gun and means connected to the elevating mechanism and operable thereby to indicate against the indicating means the quadrant elevation of the gun.

25. In a sight mount, a rotatable shaft, a sight offset with relation to the shaft and rotatably mounted thereon for movement in a plane at right angles to the path of movement of the shaft itself, means for rotating this shaft to move the sight in azimuth, a rotatable shaft concentrically mounted with respect to the first shaft, mechanism connecting the second shaft and sight so that rotation of the latter shaft will cause rotation of the sight in a vertical plane and means for rotating the second shaft.

26. A sighting apparatus for guns, embodying a sight, means for moving the sight in a vertical plane, mechanism operable by the sight moving means for indicating the amount of such movement, mechanism for adding algebraically to the movement of such indicating means a movement equivalent to the vertical deflection corrections, elevating mechanism for the gun and means connected to the elevating mechanism and operable thereby to indicate against the indicating means the quadrant elevation of the gun.

27. A sighting apparatus for guns, embodying a sight, mechanism for moving the sight to maintain the same on the target, a rotatable scale, mechanism connected to the first named mechanism for moving the scale proportionate to the movement of the sight, means for simultaneously and independently imparting an additional movement to the scale proportionate to the total vertical deflection corrections, an indicating device movable relative to the scale, elevating mechanism for the gun, and means connected to the elevating mechanism and operable thereby to move the indicating device against the scale.

28. Mechanism for laying a gun in azimuth, embodying mechanism for traversing the gun, auxiliary means associated with the traversing mechanism and operable simultaneously therewith and independently thereof for imparting additional traversing movement to the gun, a stationary scale, a movable indicator, means for moving the movable indicator with reference to the stationary scale, a movable scale, means connecting the movable scale with the auxiliary traversing means to move the movable scale with respect to the indicator.

29. Mechanism for laying a gun in azimuth, embodying mechanism for traversing the gun, a differential, auxiliary mechanism associated with the traversing mechanism and operable simultaneously therewith and independently thereof and adapted to act through the differential to impart additional traversing movement to the gun, a stationary scale, a movable indicator, means for moving the movable indicator with reference to the stationary scale, a movable scale and means connecting the movable scale with the auxiliary traversing mechanism to move the movable scale with respect to the indicator.

30. Mechanism for laying a gun in azimuth, embodying a rotatable shaft, cooperating means on the shaft, and gun carriage for traversing the gun on rotation of the shaft, a member fixed to the shaft, a member rotatable about the shaft, a differential interposed between the two members, means acting directly through the differential to move the fixed member and the shaft, means for rotating the rotatable member and acting through the differential to impart an additional movement to the shaft and fixed scale, a movable indicator, means for moving the indicator with relation to the fixed scale, a movable scale, and means connected with the shaft for moving the movable scale with respect to the indicator an amount proportionate to the rotation of the shaft.

31. Mechanism for laying a gun in azimuth, embodying a rotatable shaft, cooperating means on the shaft and gun for traversing the gun on rotation of the shaft, an internally geared member fixed to the shaft, a spider rotatable on the shaft, an externally geared member rotatable about the shaft, a pinion rotatably mounted on the spider and adapted to mesh with the internally and externally geared members, means for moving the externally geared members to traverse the gun, means for moving the spider to impart an additional movement to the gun, a fixed scale, a movable indicator, means for moving the indicator with respect to the fixed scale, a rotatable scale and means secured to the spider for moving the rotatable scale with respect to the indicator.

32. The combination with a gun carriage, of traversing mechanism for the gun, mechanism associated with the traversing mechanism and operable simultaneously therewith and independently thereof for imparting additional movement to the gun, mechanism associated with the traversing mechanism and operable thereby for indicating the total traversing movement of the gun and means associated with said indicating mechanism for resolving the secondary lateral and vertical wind and parallax corrections at the gun.

33. The combination with a gun carriage, of mechanism for traversing the carriage, indicating means actuated by said mechanism to indicate the azimuthal position of the gun, mechanism movably mounted with respect to said indicating means and adapted to be set according to known data and to indicate when set by reference to said indicating means the secondary lateral and vertical wind and parallax corrections whereby these corrections may be resolved at the gun.

34. The combination with a gun carriage, of mechanism for traversing the carriage, indicating means actuated by said mechanism to indicate the azimuthal position of the gun, mechanism movably mounted with respect to said indicating means and adapted to be set according to known data and to indicate when set by reference to said indicating means the secondary lateral and vertical wind and parallax corrections whereby these corrections may be resolved at the gun and means for locking said indicating means and said last named mechanism together so that they may move together on traverse of the gun.

35. The combination with a gun carriage, of mechanism for traversing the carriage, indicating means adapted to be actuated by said mechanism to indicate the azimuthal position of the gun, arms fixedly mounted with respect to said indicating means, indicators slidable on said arms and adapted to be set according to known data, a scale rotatably mounted with respect to said indicating means and adapted to be moved to a predetermined position with respect to said indicators and to indicate by reference to said indicating means the secondary lateral and vertical wind and parallax corrections whereby these corrections may be resolved at the gun.

36. The combination with a gun carriage, of a rotatable shaft, cooperating means on the shaft and gun carriage for traversing the gun on rotation of the shaft, a member fixed to the shaft, a member rotatable about the shaft, a differential interposed between the two members, means acting through the differential to move the fixed member and shaft, means for rotating the rotatable member and acting through the differential to impart an additional movement to the shaft, a scale, mechanism interposed between the shaft and the scale adapted to move the scale on rotation of the shaft to indicate the azimuthal position of the gun, mechanism movably mounted with respect to said indicating mechanism and adapted to be set according to known data to indicate by reference to said indicating mechanism the secondary lateral and vertical wind and parallax corrections, whereby said corrections may be resolved at the gun.

37. The combination with a gun carriage, of a movable shaft, cooperating means on the shaft and gun carriage, for traversing the gun on rotation of the shaft, a member fixed to the shaft, a member rotatable about the shaft, a differential interposed between the two members, means acting through the differential to move the fixed member and the shaft, means for rotating the rotatable member and acting through the differential to impart additional movement to the shaft, a scale, mechanism interposed between the shaft and the scale to move the scale on traverse of the gun to indicate the azimuthal position of the gun, arms fixedly mounted with respect to said scale, indicators slidable on said arms and adapted to be set according to known data, an indicating device rotatably mounted with respect to said scale and adapted to be set in accordance with known data to indicate by reference to said scale the secondary lateral and vertical wind and parallax corrections whereby these corrections may be resolved at the gun.

38. The combination with a gun carriage, of a sight mounted to normally move in traverse in unison with the gun, traversing mechanism for the gun, mechanism associated with the traversing mechanism and operable simultaneously therewith and independently thereof for imparting additional traversing movement to the gun and simultaneously moving the sight in an opposite direction, means operable by said mechanism for indicating the amount of such movement, means operable by traversing the mechanism for indicating the total traversing movement of the gun, means for setting off known data and a scale operable by such means and adapted to be read against the azimuthal scale thereby introducing the secondary lateral deflection corrections.

39. The combination with a gun carriage, of a sight mounted to normally move in traverse in unison with the gun, traversing mechanism for the gun, mechanism associated with the traversing mechanism and operable simultaneously therewith and independently thereof for imparting additional traversing movement to the gun and simultaneously moving the sight in an opposite direction, means operable by said mechanism for indicating the amount of such movement, means operable by traversing the mechanism for indicating the total traversing movement of the gun, means for setting off known data, a scale operable by such means and adapted to be read against the azimuthal scale thereby introducing the secondary lateral deflection corrections, means for moving the sight in elevation and means operable by the last named means for indicating the amount of such movement.

40. Mechanism for laying a gun in elevation, embodying movable means for indicating the present angle of site, mechanism for adding algebraically to the movement of such indicating means, a movement proportionate to the vertical deflection corrections, elevating mechanism for the gun, means connected to the elevating mechanism and operable thereby to indicate against the indicating means the quadrant elevation of the gun.

41. Mechanism for laying a gun in elevation, embodying a shaft, a scale, an internally geared member fixed on the shaft, a sleeve rotatable about the shaft, an externally geared member carried by the scale, a pinion rotatably mounted on the sleeve adapted to mesh with the internally and externally geared members, means for rotating the shaft to move the scale an amount proportionate to the present angle of site, and means for rotating the sleeve to move the scale an amount proportionate to the vertical deflection corrections an indicating device, elevating mechanism for the gun and means connected to the elevating mechanism and operable thereby to move the indicating device against the scale.

42. Mechanism for laying a gun in elevation, embodying a shaft, a scale, an internally geared member fixed on the shaft, a sleeve rotatable about the shaft, an externally geared member carried by the scale, a pinion rotatably mounted on the sleeve adapted to mesh with the externally and internally geared members, means for rotating the shaft to move the scale an amount proportionate to the present angle of site, a second scale, a differential, means for rotating the second shaft through the differential an amount proportionate to the vertical travel corrections, means for imparting additional rotation to the second shaft proportional to the secondary vertical deflection corrections, mechanism for rotating the sleeve on rotation of the second shaft, an indicating device, elevating mechanism for the gun and means connected to the elevating mechanism and operable thereby to move the indicating device against the scale to indicate thereagainst the quadrant elevation of the gun.

43. The combination with a gun carriage, of a sight mounted to normally move in traverse in unison with the gun, traversing mechanism for the gun, mechanism associated therewith and operable to introduce lateral deflection corrections to the movement in traverse of the gun while at the same time retaining the sight on the target and indicators associated with said mechanism and operable thereby to resolve the lateral deflection corrections at the gun.

RALPH L. GOETZENBERGER.